United States Patent
Choe et al.

(10) Patent No.: US 9,900,421 B2
(45) Date of Patent: Feb. 20, 2018

(54) MOBILE TERMINAL AND CONTROL METHOD THEREFOR

(71) Applicant: LG ELECTRONICS INC., Seoul (KR)

(72) Inventors: Dami Choe, Seoul (KR); Jin A Kim, Seoul (KR); Kiwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/915,575

(22) PCT Filed: Sep. 4, 2013

(86) PCT No.: PCT/KR2013/007978
§ 371 (c)(1),
(2) Date: Feb. 29, 2016

(87) PCT Pub. No.: WO2015/034112
PCT Pub. Date: Mar. 12, 2015

(65) Prior Publication Data
US 2016/0219139 A1    Jul. 28, 2016

(51) Int. Cl.
*H04M 1/725* (2006.01)
*H04W 4/00* (2018.01)

(52) U.S. Cl.
CPC ..... *H04M 1/7253* (2013.01); *H04M 1/72547* (2013.01); *H04M 1/72552* (2013.01); *H04M 1/72577* (2013.01); *H04W 4/003* (2013.01)

(58) Field of Classification Search
CPC .... G06F 3/1454; G06F 9/4443; G06F 9/4445; G06F 15/16; G06Q 10/101;
(Continued)

(56) References Cited

U.S. PATENT DOCUMENTS 5,915,098 A * 6/1999 Palmer .................. G06F 3/1415
345/601
8,756,513 B1 * 6/2014 Schmieder ............ G06F 3/0482
715/753
(Continued)

FOREIGN PATENT DOCUMENTS

JP          08-212162       8/1996
WO         2012081950       6/2012
(Continued)

OTHER PUBLICATIONS

PCT International Application No. PCT/KR2011/005137, International Search Report dated May 17, 2012, 4 pages.

*Primary Examiner* — Thai Vu
(74) *Attorney, Agent, or Firm* — Lee, Hong, Degerman, Kang & Waimey

(57) ABSTRACT

The present invention provides a mobile terminal capable of executing a plurality of applications, and the mobile terminal comprises: a wireless communication unit including a display unit; and a control unit for controlling the transmission unit so as to transmit information on the second application and controlling the reception unit so as to receive the wireless signal from the external terminal in order to control the second application, controlling the display unit so as to add or change contents constituting the executing screen on the basis of a touch input of a user for controlling the first application.

16 Claims, 22 Drawing Sheets

(58) Field of Classification Search
CPC ..... H04L 12/581; H04L 51/04; H04L 51/046; H04L 12/1813; H04L 12/1822; H04L 65/403; H04L 67/10; H04L 67/141; H04M 1/7253; H04M 1/72547; H04M 1/72552; H04M 1/72577; H04W 4/003
See application file for complete search history.

(56) References Cited

U.S. PATENT DOCUMENTS

| | | | |
|---|---|---|---|
| 2006/0053196 A1* | 3/2006 | Spataro | H04L 65/403 709/205 |
| 2009/0177981 A1* | 7/2009 | Christie | G06F 3/04883 715/758 |
| 2012/0159343 A1 | 6/2012 | Park et al. | |

FOREIGN PATENT DOCUMENTS

| | | |
|---|---|---|
| WO | 2012134150 | 10/2012 |
| WO | 2012173301 | 12/2012 |

\* cited by examiner (a)

(b)

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2013/007978, filed on Sep. 4, 2013, the contents of which are all incorporated by reference herein in their entirety.

TECHNICAL FIELD

The present invention relates to a mobile terminal which can share a control right of an application with an external terminal.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

Recently, a remote control function for controlling other mobile terminal using a single mobile terminal is being developed. Various types of terminals may be controlled by the mobile terminal through a wireless communication network, as well as electronic devices.

However, it is difficult to simultaneously activate a plurality of applications due to characteristics of the mobile terminal. Further, in order to allow a right control to an external terminal, a single application should be executed, for prevention of confusion of control commands of a plurality of applications being executed.

DISCLOSURE OF THE INVENTION

Therefore, an object of the present invention is to provide a mobile terminal capable of sharing a control right of one of a plurality of applications simultaneously activated.

To achieve these and other advantages and in accordance with the purpose of the present invention, as embodied and broadly described herein, there is provided a mobile terminal capable of executing a plurality of applications, the mobile terminal including: a wireless communication unit having a transmission unit for transmitting a wireless signal to an external terminal, and a reception unit for receiving a wireless signal from the external terminal; a display unit configured to output an execution screen of a first application, and a control screen for controlling a second application different from the first application; and a controller configured to control the transmission unit to transmit information about the second application, and to control the reception unit to receive a wireless signal from the external terminal in order to control the second application, wherein the controller controls the display unit to add or change content which constitutes the execution screen, based on a user's touch input for controlling the first application, and wherein the display unit outputs the control screen, after changing a position of the control screen based on the addition or change of the content.

In an embodiment of the present invention, the controller may control the display unit to restrict output of one region of the control screen, based on the addition or change of the content.

In an embodiment of the present invention, if output of the control screen to the display unit is entirely restricted by the content, the controller may control the display unit to output a first graphic image to receive a touch input for re-displaying the control screen on the display unit.

In an embodiment of the present invention, if a position of the control screen is changed by the content, the controller may divide the display unit into a first region for displaying the control screen, and a second region for outputting the added and changed content.

In an embodiment of the present invention, the controller may control the second application based on a user's touch input applied to the display unit where the control screen has been output.

In an embodiment of the present invention, upon reception of the user's touch input and a wireless signal from the external terminal, the controller may control the display unit to convert the control screen, into a first divided screen controlled based on the user's touch input, and a second divided screen controlled based on the received wireless signal.

In an embodiment of the present invention, the mobile terminal may further include a memory, and if the second application is controlled based on a wireless signal received by the reception unit, the controller may control the memory to store therein a changed state of the control screen by the wireless signal.

In an embodiment of the present invention, the controller may control the memory to store therein a changed state of the control screen due to control of the second application, as a moving image.

In an embodiment of the present invention, if the different application is controlled based on the wireless signal, the controller may control the memory to store therein backup information of the application, together with the image. And the controller may restore an initial state of the application using backup information corresponding to the image selected by a user.

In an embodiment of the present invention, the controller may control the display unit to store the changed control screen and the execution screen of the application, as an image.

In an embodiment of the present invention, the display unit may output a second graphic image together with the control screen, the second graphic image for selecting at least one of the wireless signal and the user's touch input in order to control the second application.

In an embodiment of the present invention, if a plurality of wireless signals are received from a plurality of external terminals in order to control the second application, the display unit may further output a third graphic image for selecting the wireless signals.

In an embodiment of the present invention, upon termination of the execution of the application, the controller may control the reception unit to restrict reception of the wireless signal for controlling the different application.

In an embodiment of the present invention, if the execution screen of the first application is converted into an execution screen of the second application, the controller may control the transmission unit to continuously transmit information about the execution screen of the second application, to the external terminal.

In an embodiment of the present invention, the display unit may output the first graphic image to receive a touch input for selecting an application being executed on the mobile terminal, to the execution screen, in order to transmit a wireless signal for controlling the control screen to the external terminal.

To achieve these and other advantages and in accordance with the purpose of the present invention, as embodied and broadly described herein, there is also provided a mobile terminal which wirelessly-communicates with an external terminal, the mobile terminal including: a display unit configured to output an execution screen of a first application including content added and changed based on a user's touch input; a wireless communication unit having a transmission unit for transmitting a wireless signal to the external terminal, and a reception unit for receiving information about a second application being executed on the external terminal; and a controller configured to control the display unit to output the control screen of the second application, to the execution screen, wherein the controller controls the display unit to output the control screen, after changing a position of the control screen based on addition and change of the content, and wherein the controller controls the transmission unit to transmit a wireless signal for controlling the second application, based on a touch input applied to the control screen.

In an embodiment of the present invention, the controller may control the display unit to restrict output of one region of the control screen, based on addition or change of the content.

In an embodiment of the present invention, upon reception of information about a plurality of applications being executed on the external terminal, the controller may control the display unit to selectively output the control screen corresponding to the plurality of applications, based on a user's touch input.

To achieve these and other advantages and in accordance with the purpose of the present invention, as embodied and broadly described herein, there is also provided a method for controlling a mobile terminal, the method including: executing a plurality of applications, and performing wireless communication with an external terminal; outputting an execution screen of a first application among the plurality of applications and a control screen of a second application, such that the control screen is overlapped with at least part of the execution screen; adding and changing content which constitutes the execution screen, based on a touch input for controlling the first application; outputting the control screen, after changing a position of the control screen based on addition and change of the content; and controlling the different application based on a wireless signal, wherein the second application is controlled based on at least one of a user's touch input applied to the control screen, and a wireless signal received from the external terminal.

In an embodiment of the present invention, the method may further include dividing the display unit into a first region for displaying the control screen, and a second region for outputting the content, if the position of the control screen is changed.

Advantageous Effects

In the present invention, a control screen of an application controllable by an external terminal is output to an execution screen of an application being currently activated, and an output position of the control screen is changed according to a change of content included in the execution screen.

Thus, a user may check a controlled state of another application of which control right has been allowed to an external terminal, while controlling an activated application.

That is, a user needs not additionally provide a control result of an application when he or she wishes to share a control right of the application with another party, by sharing a controlled state of the application with an external terminal.

MODES FOR CARRYING OUT THE PREFERRED EMBODIMENTS

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
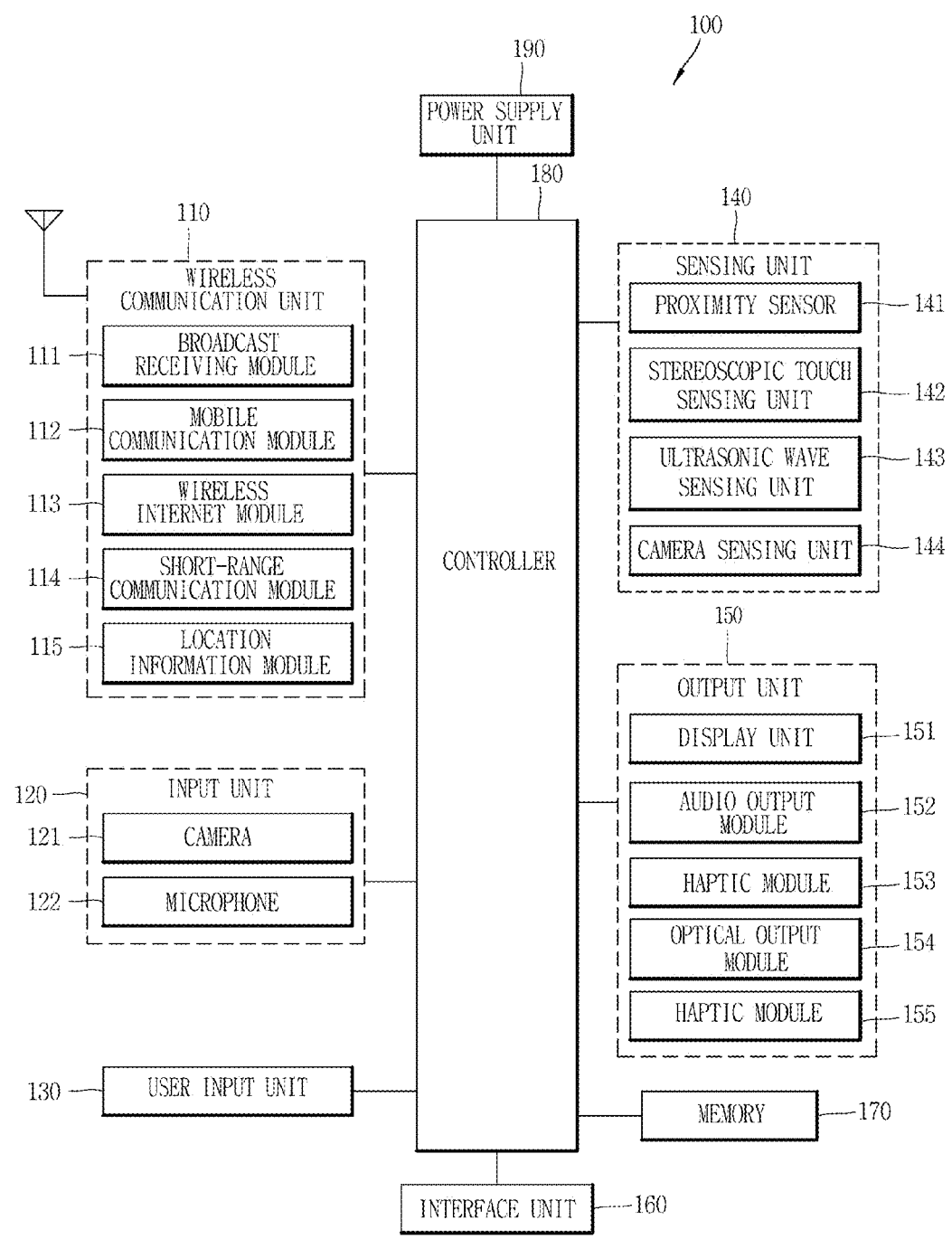
FIG. 1 is a block diagram of a mobile terminal according to an embodiment of the present invention.

FIG. 1 is a block diagram of a mobile terminal 100 in accordance with one exemplary embodiment.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input to the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
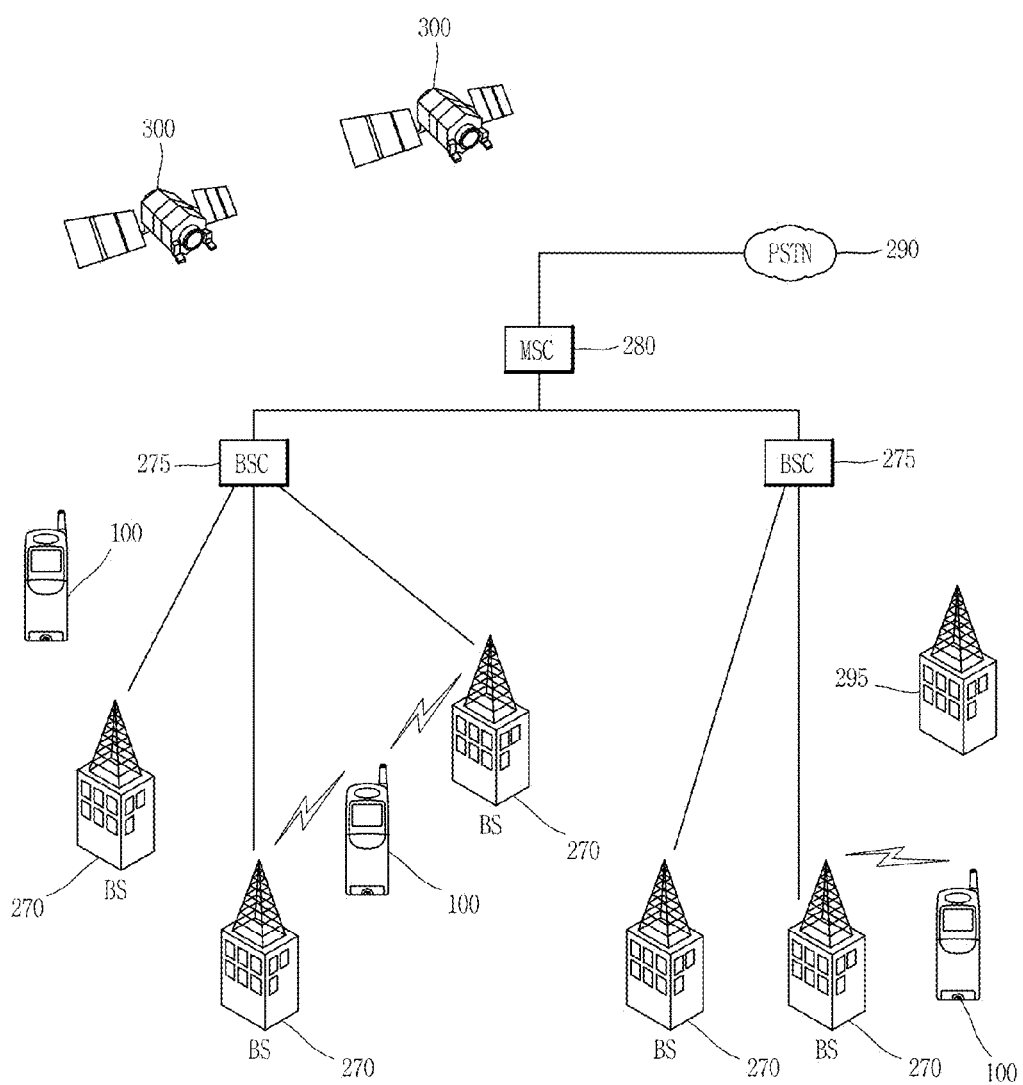
FIGS. 2A and 2B are conceptual views of a communication system where a mobile terminal of the present invention is operable.
Figure 2B:
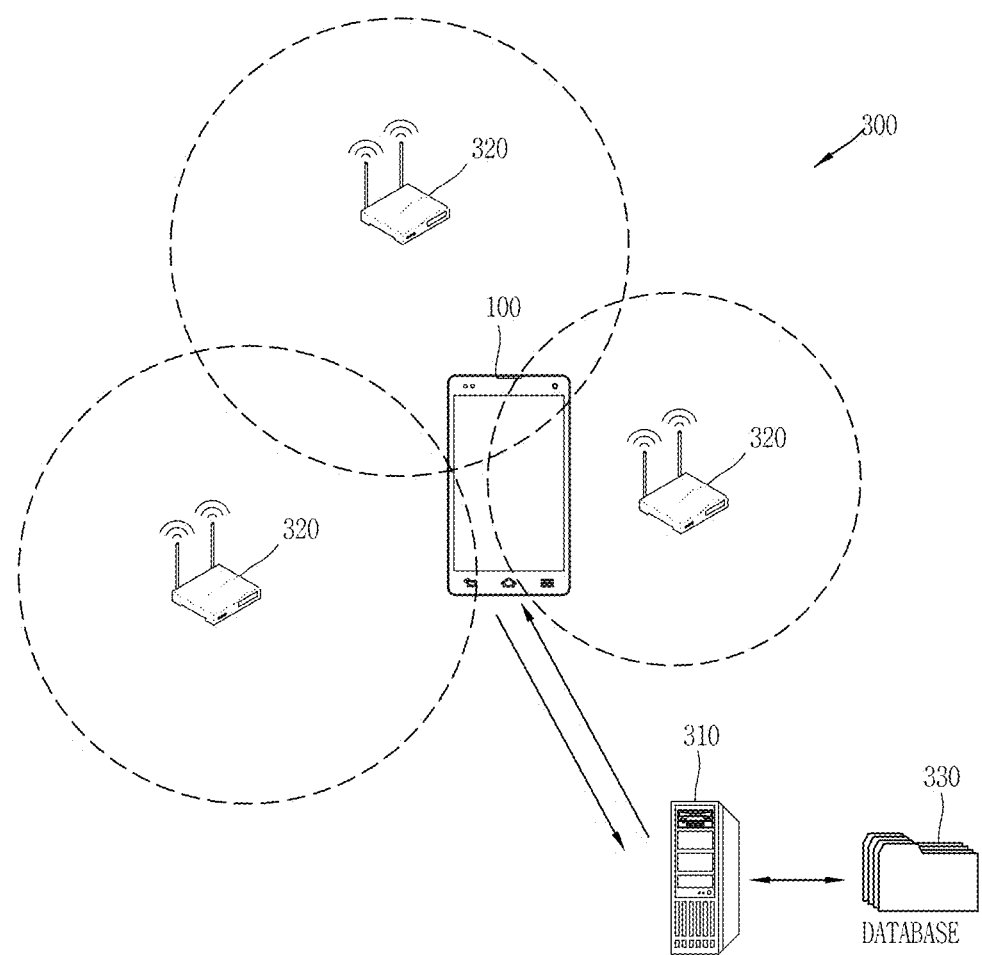

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminal s 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminal s 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminal s 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminal s 100. The mobile terminal s 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminal s 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Figure 3A:
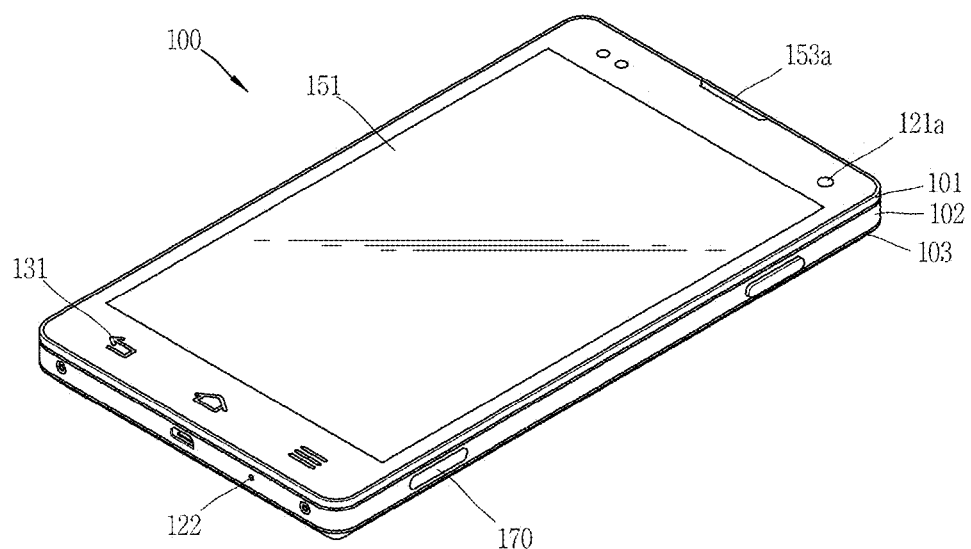
FIG. 3A is a front perspective view of a mobile terminal according to the present invention.

FIG. 3A is a front perspective view of a mobile terminal according to the present invention;

The mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102. A rear cover 103 may be detachably coupled to the rear case 102.

The cases 101, 102, 103 may be formed by injection-molding synthetic resin or may be formed of a metal, for example, stainless steel (STS), aluminum (Al), titanium (Ti), or the like.

A display unit 151, a first audio output module 153a, a first camera 121a, a first manipulation unit 131, etc. are arranged on a front surface of the terminal body, and a microphone 122, an interface unit 170, a second manipulation unit 132, etc. are provided on a side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured to have a transmissive characteristic such that visual information output to the display unit 151 is visible, and may include a structure for enhancing visibility at a bright place. Referring to FIG. 3A, the display unit 151 occupies most parts of a front surface of the front case 101.

The first audio output module 153a and the first camera 121a are arranged at a region adjacent to one end among two ends of the display unit 151, and the first manipulation unit 131 and the microphone 122 are arranged at a region adjacent to another end among two ends of the display unit 151. The second manipulation unit 132 (refer to FIG. 3B), the interface unit 170, etc. may be disposed on a side surface of the terminal body.

The first audio output module 153a may be implemented in the form of a receiver to transmit a call sound to a user's ears, or a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies. In this case, a hole independently formed to output audio sounds may not be seen or is otherwise hidden in terms of appearance, thereby further simplifying the appearance and manufacturing of the mobile terminal 100.

The first camera 121a can process image frames such as still or moving images obtained by the image sensor in a capture mode or a video call mode. The processed image frames can then be displayed on the display unit 151.

The user input unit 130 configured to input a command for controlling an operation of the mobile terminal 100 may include first and second manipulation units 131 and 132. The first and second manipulation units 131 and 132 may also be commonly referred to as a manipulating portion, and may employ any tactile method that allows the user to perform manipulation such as touch, push, scroll, or the like.

In the drawings, the first manipulation unit 131 is implemented as a touch key, but possible alternatives include a mechanical key, a push key, a touch key, and combinations thereof.

Input received at the first and second manipulation units 131 and 132 may be used in various ways. For example, the first manipulation unit 131 may be used by the user to provide an input to a menu, home key, cancel, search, or the like, and the second manipulation unit 132 may be used by the user to provide an input to control a volume level being output from the first audio output modules 153a, to switch to a touch recognition mode of the display unit 151, or the like.

The microphone 122 is configured to receive a user's voice, other sound, etc. The microphone 122 may be provided at a plurality of regions to receive a stereo sound.

The interface unit 170 may serve as a path allowing the mobile terminal 100 to interface with external devices. For example, the interface unit 170 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 170 may be implemented in the form of a socket for accommodating an external card, such as Subscriber Identification Module (SIM), User Identity Module (UIM), or a memory card for information storage.

Figure 3B:
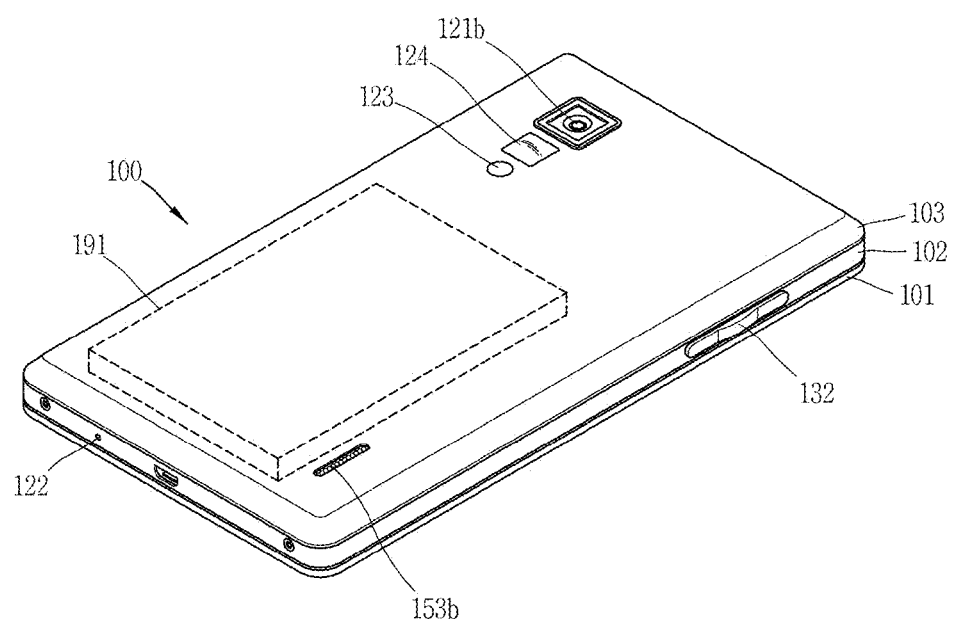
FIG. 3B is a rear perspective view of the mobile terminal shown in FIG. 3A.

FIG. 3B is a rear perspective view of the mobile terminal 100 shown in FIG. 3A.

Referring to FIG. 3B, a second camera 121b may be additionally mounted to a rear surface of the terminal body, i.e., the rear case 102. The second camera 121b includes an image capturing direction that is substantially opposite to the image capturing direction of the first camera unit 121a. The second camera 121b may have different pixels from the first camera 121a.

For example, the first camera 121a may operate with relatively lower pixels (lower resolution). Thus, the first camera 121a may be useful when a user can capture his face and send it to another party during a video call or the like. On the other hand, the second camera 121b may operate with a relatively higher pixels (higher resolution) such that it can be useful for a user to obtain higher quality pictures for later use. The first and second cameras 121a and 121b may be installed at the terminal body so as to rotate or pop-up.

A flash 123 and a mirror 124 (not shown) may be additionally disposed close to the second camera 121b. The flash 123 operates in conjunction with the second camera 121b when taking a picture using the second camera 121b.

The mirror 124 can cooperate with the second camera 121b to allow a user to photograph himself in a self-portrait mode.

A second audio output unit 153b may be additionally arranged on a rear surface of the terminal body. The second audio output unit 153b may cooperate with the first audio output unit 153a (refer to FIG. 3A) so as to implement a stereo function. Also, the second audio output unit 153b may be configured to operate as a speakerphone.

Not only an antenna for calling, but also a broadcast signal receiving antenna (not shown) may be additionally disposed on a side surface of the terminal body. The antenna which configures a part of the broadcast receiving module 111 (refer to FIG. 1) may be retractable into the terminal body.

A power supply unit 190 (refer to FIG. 1) for supplying power to the mobile terminal 100 is provided at the terminal body. The power supply unit 190 may include a battery 191, which is mounted in the terminal body or detachably coupled to an outside of the terminal body. The rear cover 103 is shown coupled to the rear case 102 for shielding the battery 191, to prevent separation of the battery 191, and to protect the battery 191 from an external impact or from foreign material.

Furthermore, the extracted location information of the mobile terminal 100 may be transmitted to the mobile terminal 100 through the WiFi location determination server 310, thereby acquiring the location information of the mobile terminal 100.

Figure 4:
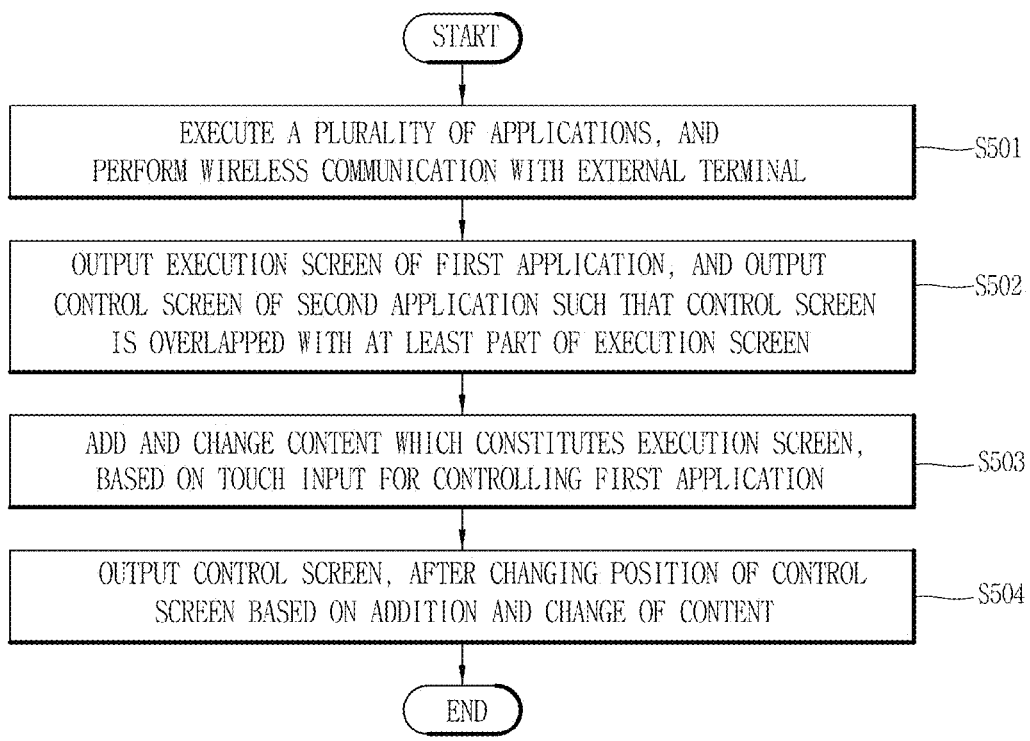
FIG. 4 is a flowchart illustrating a method for controlling a mobile terminal according to an embodiment of the present invention.
Figure 5:
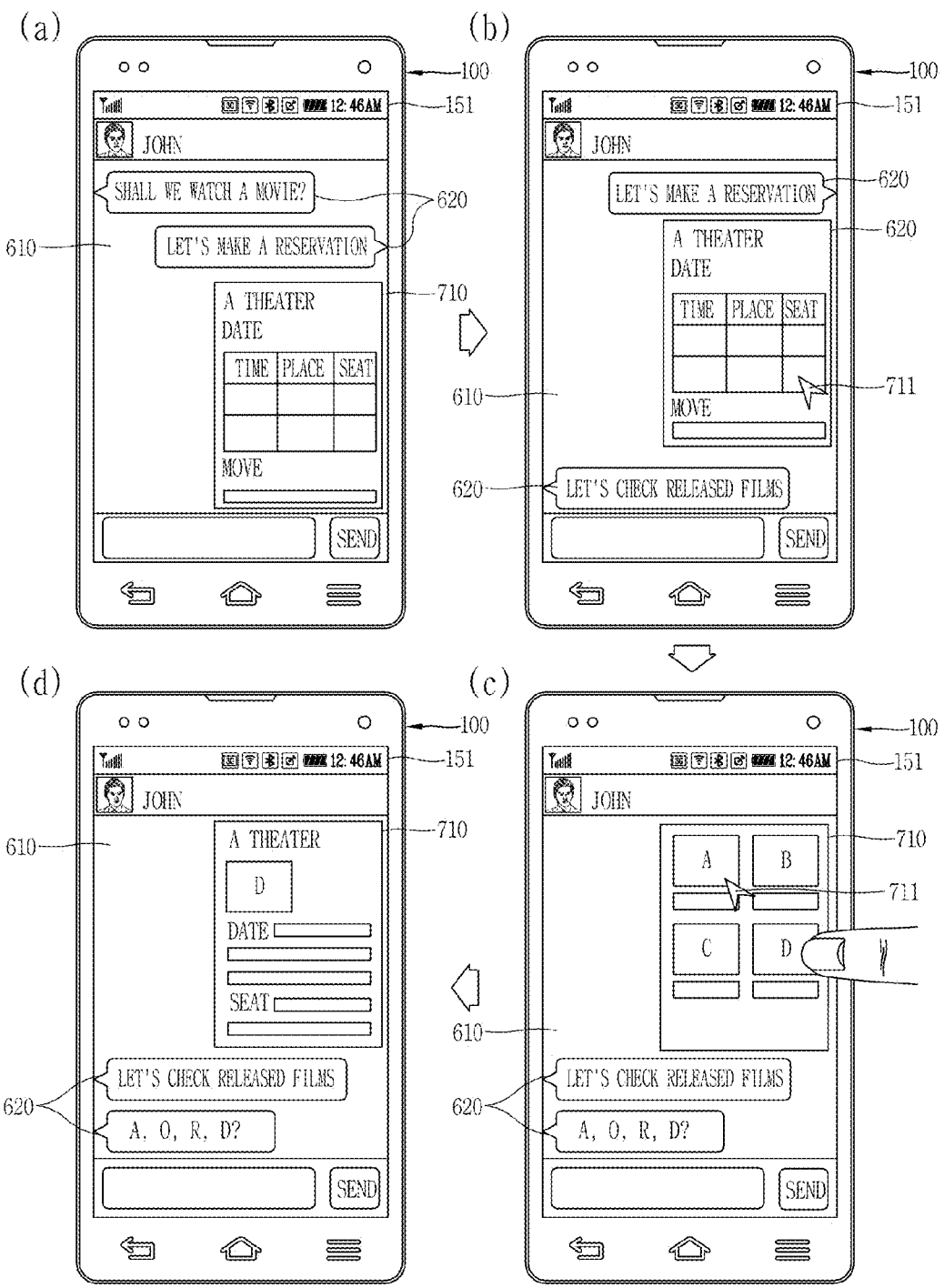
FIG. 5 is a conceptual view illustrating the control method of FIG. 4.

FIG. 4 is a flowchart illustrating a method for controlling a mobile terminal according to an embodiment of the present invention, and FIG. 5 is a conceptual view illustrating the control method of FIG. 4.

The mobile terminal according to the present invention is wirelessly connected to one or more external terminals. The mobile terminal executes a plurality of applications, and performs wireless communication with an external terminal (S501). For instance, at least one of the applications may be an application for transmitting and receiving content to/from the external terminal through the wireless communication unit 110. For instance, the application may be a message application for transmitting or receiving texts and images, or a chatting application for transmitting or receiving various contents.

The controller 180 controls the wireless communication unit 110 to transmit or receive content selected based on a user's control command, using the application. Thus, a user and another party may share information using an application being currently activated.

The controller 180 activates a first application among a plurality of applications being currently executed by a user, and controls the display unit 151 to output an execution screen 610 of the first application. The display unit 151 outputs the execution screen of the first application to an entire region thereof, and an execution screen of other application which has been activated on the display unit 151 disappears from the display unit 151.

The display unit 151 outputs a control screen 710 of a second application, in an overlapped manner with the execution screen 610 of the first application at least partially. The first and second applications are different from each other, and the second application is being executed together with the first application. Alternatively, the second application is in a deactivated state.

The control screen 710 is substantially the same as at least part of an execution screen of the second application. The control screen 710 is formed to have a preset area.

The execution screen 610 of the first application includes at least one content 620. If a user's touch input for controlling the first application is applied, the controller 180 controls the display unit 151 to add or change the content 620 of the execution screen 610 (S503).

For instance, if the mobile terminal transmits and receives (transceives) content with an external terminal by executing the first application in a dialogue manner, the content may be texts, images, etc. corresponding to conversation content input by a user or another party. Upon input of the content, the display unit 151 outputs the content on a preset region thereof. For instance, the display unit 151 may output content input by a user to a region adjacent to a right edge of the display unit 151, and may output content input by another party to a region adjacent to a left edge of the display unit 151.

If the content is continuously input, the display unit 151 restricts output of the oldest content, and outputs most recent content. However, the display unit 151 may output content having not been output, based on a user's touch input (e.g., dragging method) applied to the display unit 151. Thus, a user may be sequentially provided with content transmitted to or received from an external terminal as an application is executed.

The controller 180 controls the display unit 151 to output the control screen 710 by changing a position of the control screen 710 based on addition and change of the content 620 (S504). Referring to FIG. 5A, if the control screen 710 is output based on a user's control command with respect to the mobile terminal, the display unit 151 may output the control screen 710 to a region adjacent to the right edge of the display unit 151, like the output region of the content. If the control screen 710 is output by another party, the display unit 151 may output the control screen 710 to a region adjacent to the right edge of the display unit 151.

However, the present invention is not limited to this. That is, an output position of the control screen 710 may be variable according to a size of the control screen 710 or a user's setting.

Referring to FIG. 5B, if new content is input by a user or another party, the display unit 151 outputs the previously-displayed content by moving to an upper region of the display unit 151. At least part of the old content disappears from the display unit 151. The display unit 151 outputs the content by changing a position of the content being output thereon, and by changing a position of the control screen 710 thereon. That is, if new content is output to a lower region of the display unit 151, the control screen 710 is output to an upper region of the display unit 151 by having a position change.

The second application corresponding to the control screen 710 may be controlled based on a wireless signal received from another party. That is, the controller 180 controls the wireless communication unit to receive a wireless signal related to content for controlling the first application, and a wireless signal related to the second application corresponding to the control screen 710 output to the display unit 151.

Although not shown, the controller 180 controls the wireless communication unit to transmit, to the external terminal, information about the second application and information about the control screen. A display unit of the external terminal outputs a control screen for controlling the second application, based on the information. For instance, the wireless signal may be formed based on another party's touch input applied to the control screen.

The display unit 151 outputs a pointer 711 formed based on the wireless signal to the control screen 710. For instance, the pointer 711 may be output in correspondence to another party's touch input applied to the control screen of the display unit of the external terminal.

Referring to FIG. 5C, the controller 180 controls the second application based on the wireless signal. For instance, the control screen includes one or more graphic images for receiving a control command, and the controller 180 applies a control command to the graphic image based on the wireless signal. Thus, the display unit 151 may convert screen information which constitutes the control screen 710.

A touch input for controlling the second application is applied to the control screen 710 output to the display unit 151. For instance, the controller 180 may convert the screen information into other screen information, based on a touch input applied to a graphic object of the control screen 710.

That is, the controller 180 receives a wireless signal from the external terminal, in order to control the second application. And the controller 180 controls the mobile terminal to receive a touch input applied to the control screen. Thus, the controller 180 may control the second application based on control commands of a user and another party.

In the present invention, a control screen of an application controllable by an external terminal is output to an execution screen of an application being currently activated. And an output position of the control screen is changed according to a change of content included in the execution screen.

Thus, a user may check a controlled state of another application of which control right has been allowed to an external terminal, while controlling an activated application.

That is, a user needs not additionally provide a control result of an application when he or she wishes to share a control right of the application with another party, by sharing a controlled state of the application with an external terminal.

FIGS. 6A to 6D are conceptual views illustrating an output method of the control screen.

Figure 6A:
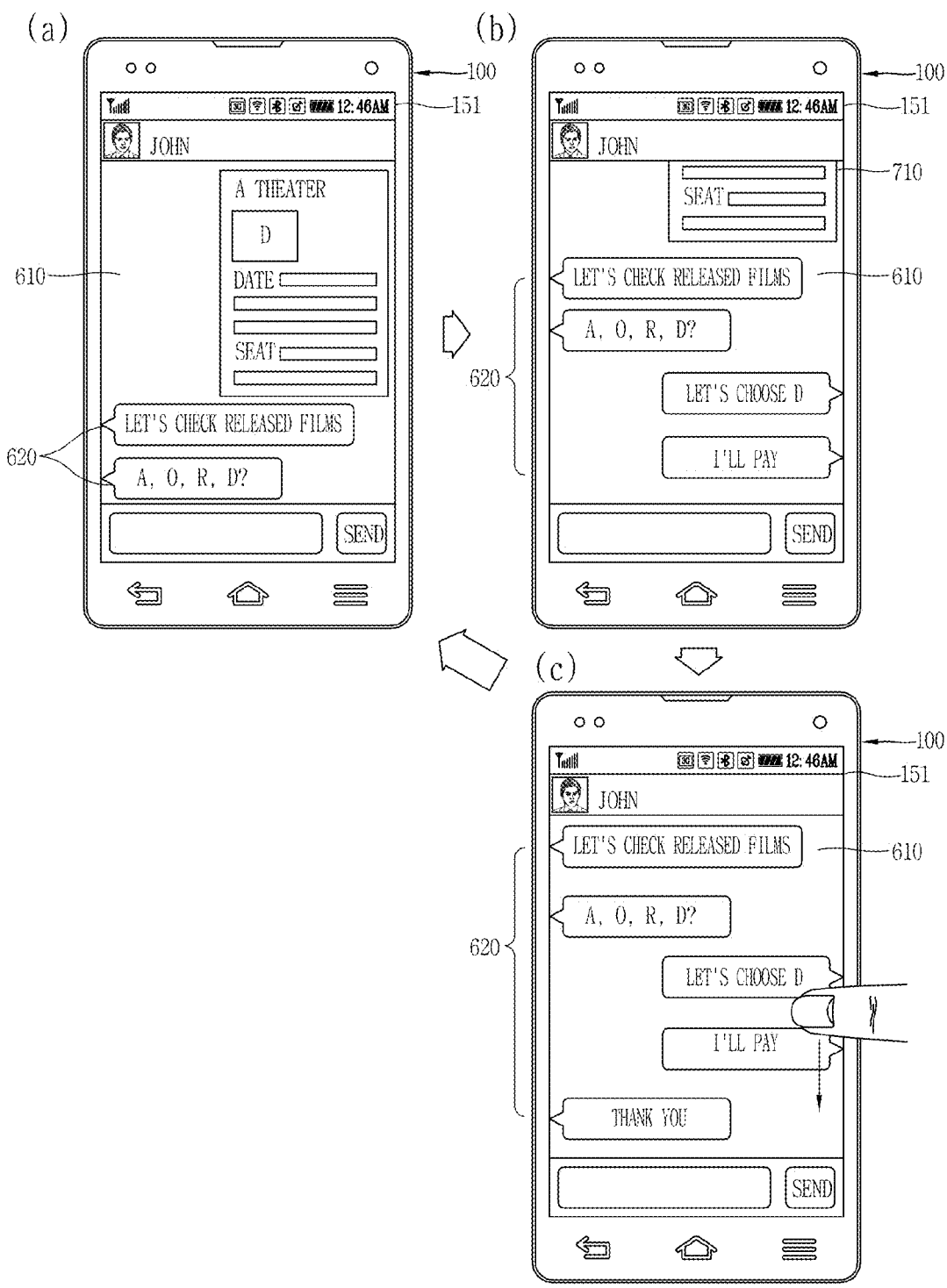
FIGS. 6A to 6D are conceptual views illustrating an output method of a control screen.

Referring to FIG. 6A, an output method of the control screen according to an embodiment of the present invention will be explained. Upon addition of the content 620 of the first application, the display unit 151 outputs the added content 620 to a lower region thereof. Thus, the display unit 151 gradually moves an output position of the control screen 710 to an upper region thereof.

As the added content is output, the controller 180 controls the display unit 151 to restrict output of at least one region of the control screen 710. That is, if the number of content output to the display unit 151 is increased, the display unit 151 may restrict output of all regions of the control screen 710.

The controller 180 may control the wireless communication unit 110 to continuously receive a wireless signal for controlling the second application. That is, even if the control screen 710 is not visible on the display unit 151, the controller 180 may allow control of the second application by another party. In a case where at least part of the control screen 710 is not output to the display unit 151 based on a user's setting, control of the second application by another party may be restricted.

The second application may correspond to all applications differentiated from the first application. For instance, the application may be a gallery application, a text message application, a call application, an Internet application for outputting a web page, a media file play application for play as time lapses, etc., each application installed in the mobile terminal.

The controller 180 may control the display unit 151 to output the control screen 710, based on a touch input applied to the display unit 151. The touch input may be a dragging type touch input applied in a lengthwise direction (vertical direction) of the display unit 151. The touch input is substantially the same as a touch input for outputting the previous content 620 which has disappeared from the display unit 151 based on the added content 620.

That is, even if output of the control screen 710 to the display unit 151 is restricted by the added content 620 of the first application, the controller 180 may re-output the control screen 710 based on a touch input applied to the display unit 151.

Figure 6B:
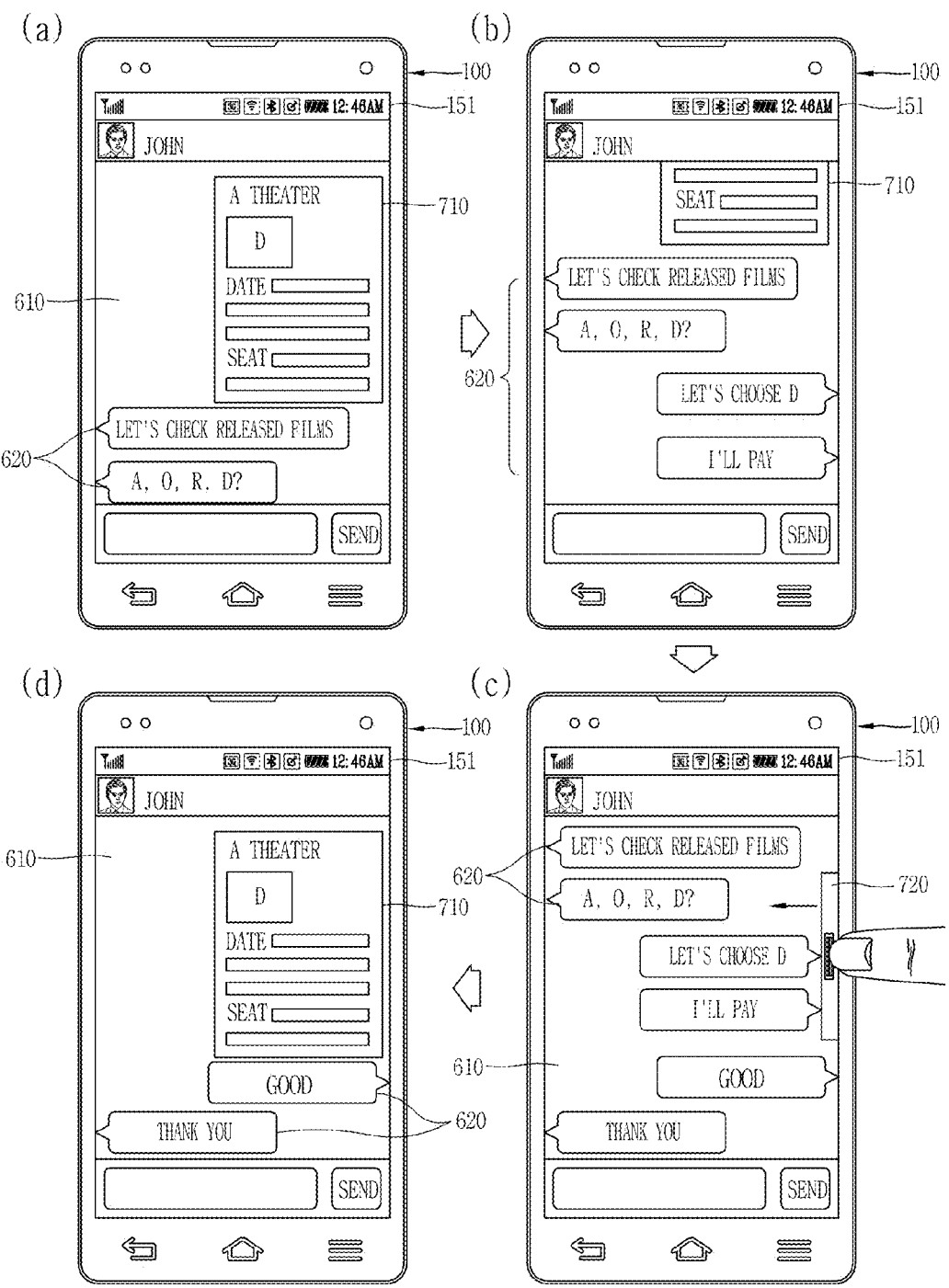

Referring to FIG. 6B, an output method of the control screen according to another embodiment of the present invention will be explained. In a case where output of at least part of the control screen 710 is restricted, the controller 180 controls the display unit 151 to output an activation image 720 corresponding to the control screen 710.

If a preset region of the control screen 710 is blocked, the controller 180 restricts output of the entire region of the control screen 710, and converts the control screen 710 into the activation image 720 for output. For instance, if more than half of the control screen 710 disappears, the controller 180 may control the display unit 151 to output the activation image 720.

The activation image 720 receives a user's touch input for outputting the entire region of the control screen 710, to the display unit 151. Preferably, the activation image 720 is displayed on an edge region of the display unit 151. Even if the added content 620 has been output, the display unit 151 continuously outputs the activation image 720. As shown in FIG. 6B(c), the activation image 720 may be output to a region adjacent to the right edge of the display unit 151.

The controller 180 may control the display unit 151 to convert the activation image 720 into the control screen 710, based on a touch input applied to the activation image 720. The touch input may be a consecutive touch input (dragging type) for moving the activation image 720 to a central region of the display unit 151.

The display unit 151 outputs the control screen 710 to a preset position on the display unit 151, based on the touch input. For instance, the control screen 710 may be output to an uppermost region of the display unit 151, or a region adjacent to the activation image 720. In this case, the controller 180 controls the display unit 151 to output part of the content which has been output to the display unit 151, to be output to a lower region than the control screen 710.

In this embodiment, a user may be continuously provided with the control screen of the second application from another party, while controlling the first application.

Figure 6C:
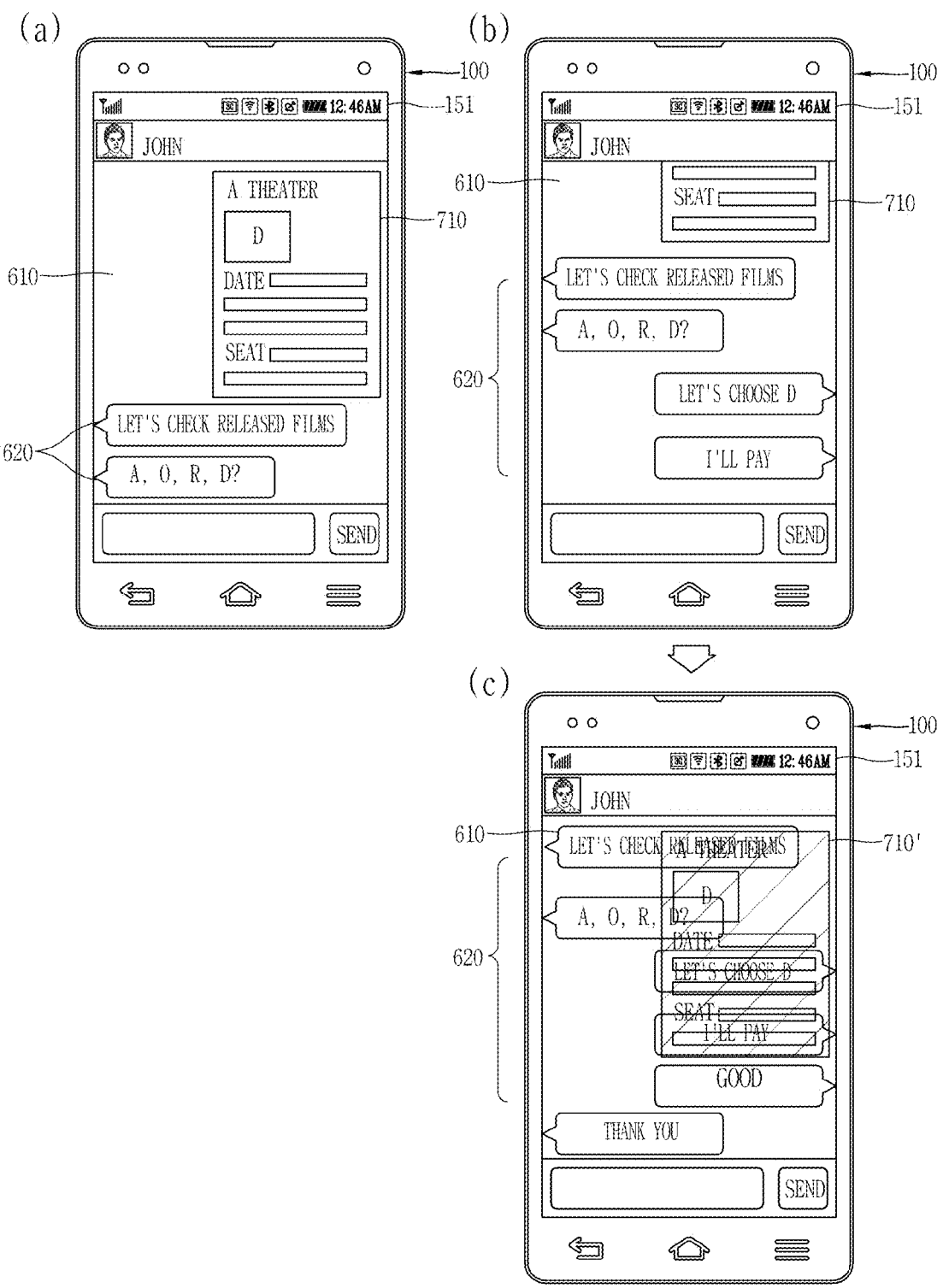

Referring to FIG. 6C, an output method of the control screen according to another embodiment of the present invention will be explained. If output of a preset region of the control screen 710 is restricted, the controller 180 controls the display unit 151 to output a transformed control screen 710' having its transparent degree controlled.

The transformed control screen 710' is output to a preset region on the display unit 151. The transformed control screen 710' is output in a semi-transparent state, and in an overlapped manner with at least part of the content 620.

Although not shown, a user may control a transparent degree of the transformed control screen 710', and may convert the transformed control screen 710' into the control screen 710 by applying a control command.

Figure 6D:
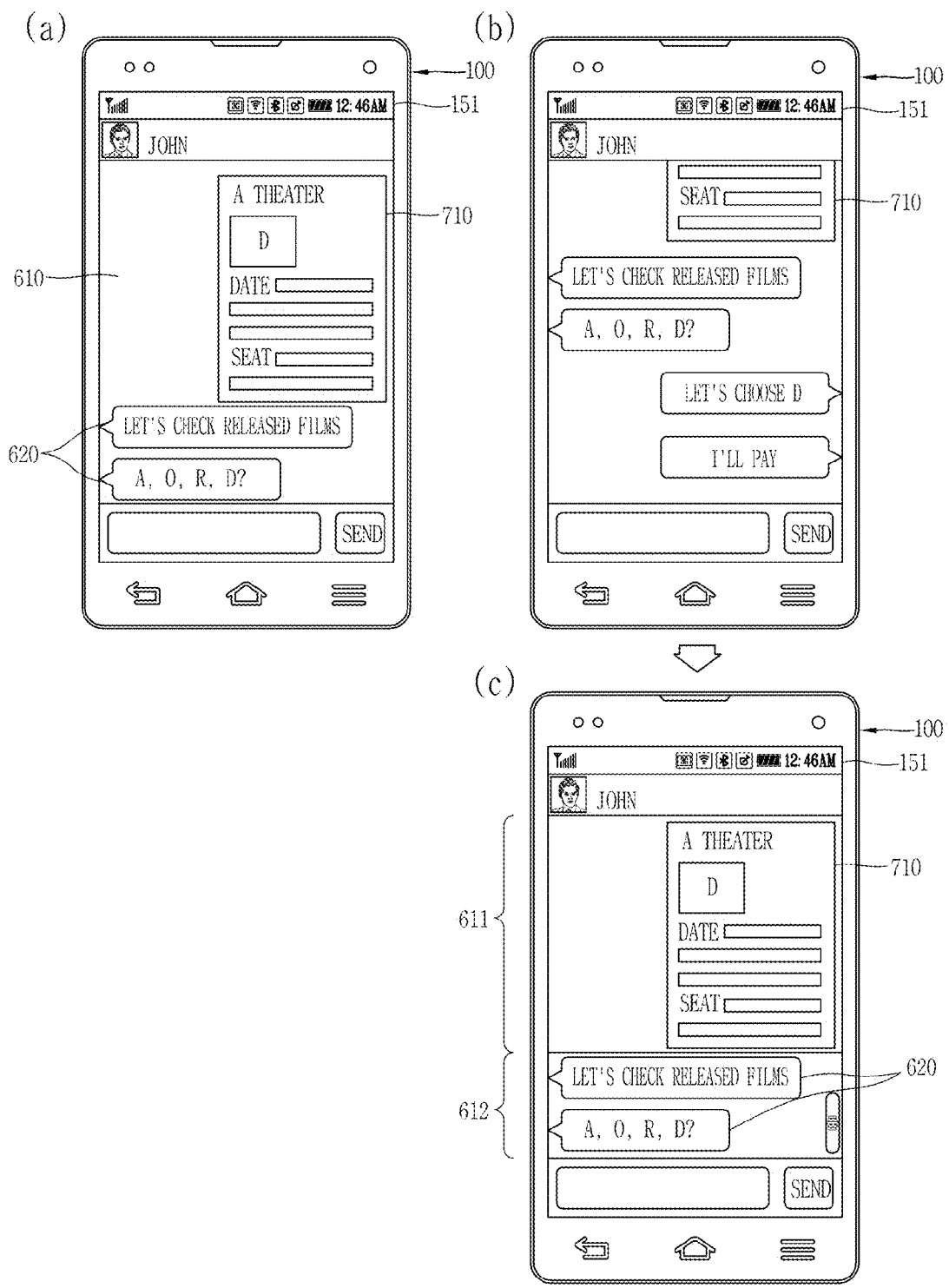

Referring to FIG. 6D, an output method of the control screen according to another embodiment of the present invention will be explained. If output of a preset region of the control screen 710 is restricted, the controller 180 divides the display unit 151 into a first region 611 and a second region 612. As shown in FIG. 6D(c), the first and second regions 611, 612 may be defined as upper and lower regions of the display unit 151. Alternatively, the first and second regions 611, 612 may be defined as right and left regions of the display unit 151.

The first and second regions 611, 612 are defined as regions independent from each other, and do not influence on each other by a touch input applied thereto. However, the first and second regions 611, 612 may implement a consecutive aesthetic sense. For instance, the display unit 151 may output the first and second regions 611, 612 to part of the execution screen of the first application. Thus, a user may recognize an activated state of the first application on the display unit 151.

The control screen 710 is output to the first region 611. The first region 611 may be defined according to a size of the control screen 710. The first region 611 outputs the control screen 711, irrespective of addition and change of the content under control of the first application.

The content 620 of the first application is output to the second region 612. The content 620 is added or changed within the second region 612, under control of the first application. Based on the addition of the content 620, the display unit 151 outputs the added content 620 rather than the previously-output content, to the second region 612. That is, the previously-output content and the added content are not output to the first region 611. Based on a touch input applied to the second region 612, the controller 180 may control the display unit 151 to re-output content which is not currently being output. The display unit 151 may output a scroll bar to the second region 612.

With such a configuration, the display unit 151 may output the new content 620 under control of the first application, and may continuously provide the control screen 710 to a user.

Although not shown, output regions of the control screen 710 and the content 620 may be interchanged with each other based on a user's control command. The display unit 151 may output the control screen 710 with the same size as the first region.

Thus, a user may be continuously provided with the control screen of the second application, while controlling the first application.

Figure 7A:
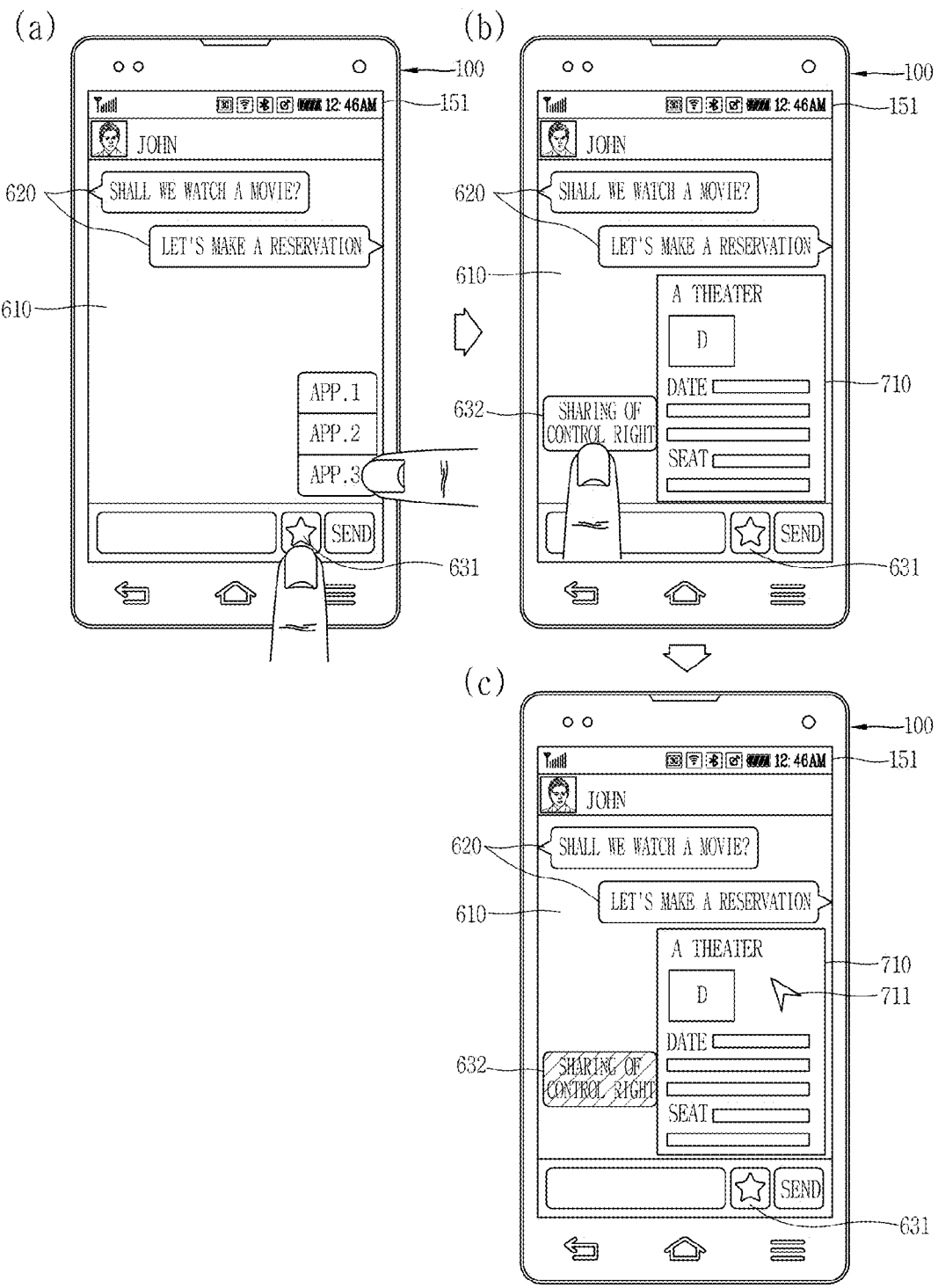
FIGS. 7A and 7B are conceptual views illustrating a method for controlling a control right of a second application.
Figure 7B:
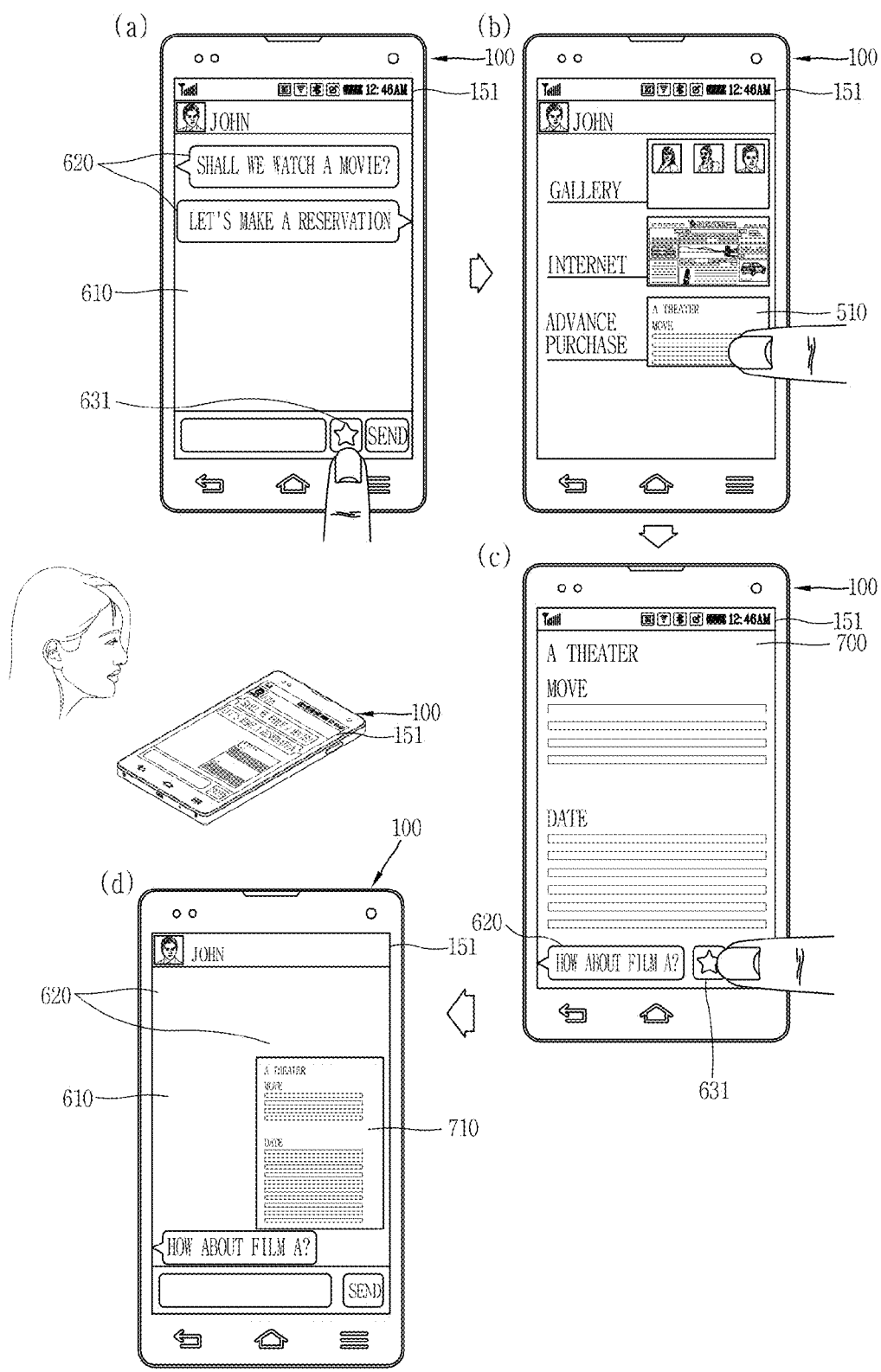

FIGS. 7A and 7B are conceptual views illustrating a method for controlling a control right of the second application.

Referring to FIG. 7A, a method for sharing a control right with another party by a user's selection will be explained. Referring to FIGS. 7A(a) and 7A(b), the display unit 151 outputs a first graphic image 631 for receiving a user's touch input, to the execution screen 610 of the first application.

The controller 180 controls the display unit 151 to output a list of one or more selectable applications, based on a touch input applied to the first graphic image 631. For instance, the one or more selectable applications may be applications which are in a deactivated state, or applications being executed. If one of the applications being executed is selected by a user, the controller 180 may control the display unit 151 to output screen information as the control screen 710, the screen information corresponding to a time point when the application being executed is converted into a deactivated state.

If only the first application is being executed on the mobile terminal, the controller 180 may include a preset application in the list, or may output a list of home screen pages.

The preset application may be preset by a user or a provider of the mobile terminal, so as to be activated together with the first application. Alternatively, the preset application may be an application recently-executed by a user. Further, the controller 180 may analyze dialogue contents between a user and another party, corresponding to the content. Then, the controller 180 may output a recommended application expected to be required by sentences, words, etc. included in the content, to the list.

For instance, if the home screen page is selected from the list, the display unit 151 may output one of a plurality of home screen pages as the control screen 710, and may execute at least one application based on a user's touch input. Upon execution of the at least one application, the display unit 151 converts the home screen page into a control screen of the executed application.

The applications included in the list may include an application not installed on the external terminal. That is, another party needs not install a specific application for sharing a control right of the specific application.

The controller 180 controls the display unit 151 to output the control screen 710 of the second application selected from the list, together with the execution screen 610. The display unit 151 outputs a second graphic image 632 for controlling a control right, together with the control screen 710.

Preferably, the second graphic image 632 is output to a region adjacent to the control screen 710. The controller 180 may allow another party to use a control right of the second application, or may restrict another party from using the control right, based on a touch input applied to the second graphic image 632. The controller 180 controls the control right to be allowable or restricted, based on a touch input applied to the second graphic image 632.

That is, if another party's control right is restricted based on a touch input applied to the second graphic image 632, the controller 180 controls a wireless signal transmitted from the external terminal not to be received, in order to control the second application. Thus, even if another party applies a touch input to the display unit of the external terminal, the second application cannot be controlled by said another party.

As a control right is allowed to be used or is restricted from being used by another party, the display unit 151 may output the second graphic image 632 with a changed shape. If the control right is allowed to another party, the display unit 151 outputs the pointer 711 formed based on the wireless signal to the control screen 710.

Even in a case where the control right of another party is not allowed, the display unit 151 may continuously output the execution screen 610 and the control screen 710. The controller 180 may control the second application based on a user's touch input applied to the control screen 710.

If the second application is controlled and the control screen 710 is changed based on a user's touch input, the controller 180 controls the wireless communication unit 110 to transmit information about the second application and information about the control screen 710. That is, another party may be continuously provided with the information about the second application controlled by a user, even if he or she cannot control the second application.

Referring to FIG. 7B, a method for controlling a control right according to another embodiment will be explained. The controller 180 controls the display unit 151 to output a task management screen 510 based on a touch input applied to the first graphic image 631, the task management screen 510 including information about at least one application being executed on the mobile terminal.

The controller 180 controls the display unit 151 to output an execution screen 700 of the second application, selected based on a touch input applied to the task management screen 510. That is, the display unit 151 converts the execution screen 610 of the first application, into the execution screen 700 of the second application.

Referring to FIG. 7B(b), the controller 180 controls the wireless communication unit 110 to transmit information about the second application, to the external terminal. The display unit 151' of the external terminal 100' outputs the execution screen 610 of the first application, and the control screen 610 corresponding to the second application. That is, while the display unit 151 of the mobile terminal outputs the execution screen of the second application, the first application being executed on the mobile terminal is not terminated.

The controller 180 controls the second application based on a touch input applied onto the execution screen 700 of the second application. The controller 180 controls the wireless communication unit 110 to continuously transmit, to the external terminal, the information about the second application controlled by a user. Thus, the display unit 151' outputs screen information by a user's control of the second application, to the control screen 710.

The controller 180 may control another party to have a control right of the second application. The controller 180 controls the wireless communication unit 110 to receive a wireless signal, based on a touch input applied to the control screen 710 of the display unit 151', and controls the second application based on the wireless signal. Further, the controller 180 controls the display unit 151 to output the execution screen of the second application, based on the wireless signal. Although not shown, the controller 180 controls the display unit 151 to output the pointer 711 (refer to FIG. 5) to the execution screen 700 of the second application, if the control right of the second application is allowed to another party.

Referring to FIGS. 7B(c) and 7B(d), the display unit 151 outputs the first graphic image 631 to the execution screen 700. The controller 180 may control the display unit 151 to output the execution screen 610 of the first application, based on a touch input applied to the first graphic image 631 on the execution screen 700. In this case, the display unit 151 outputs the control screen 710 of the second application to the execution screen 610.

Referring to FIG. 7B(c), while the execution screen 700 of the second application is being output, the controller 180 receives content of the first application from the external terminal, and controls the display unit 151 to output the content.

For instance, if content input by another party is received by the wireless communication unit 110, the controller 180 may control the display unit 151 to output the content in an overlapped manner with one region of the execution screen. The display unit 151 may output the content for only a preset time (e.g., several seconds).

Thus, a user may recognize that the first application is being executed, and the mobile terminal is wirelessly communicating with the external terminal of another party.

In this embodiment, if a user outputs the execution screen 700 of the second application to an entire region of the display unit 151, the external terminal may be provided with the execution screen 700 of the second application, on the execution screen of the first application.

Figure 8A:
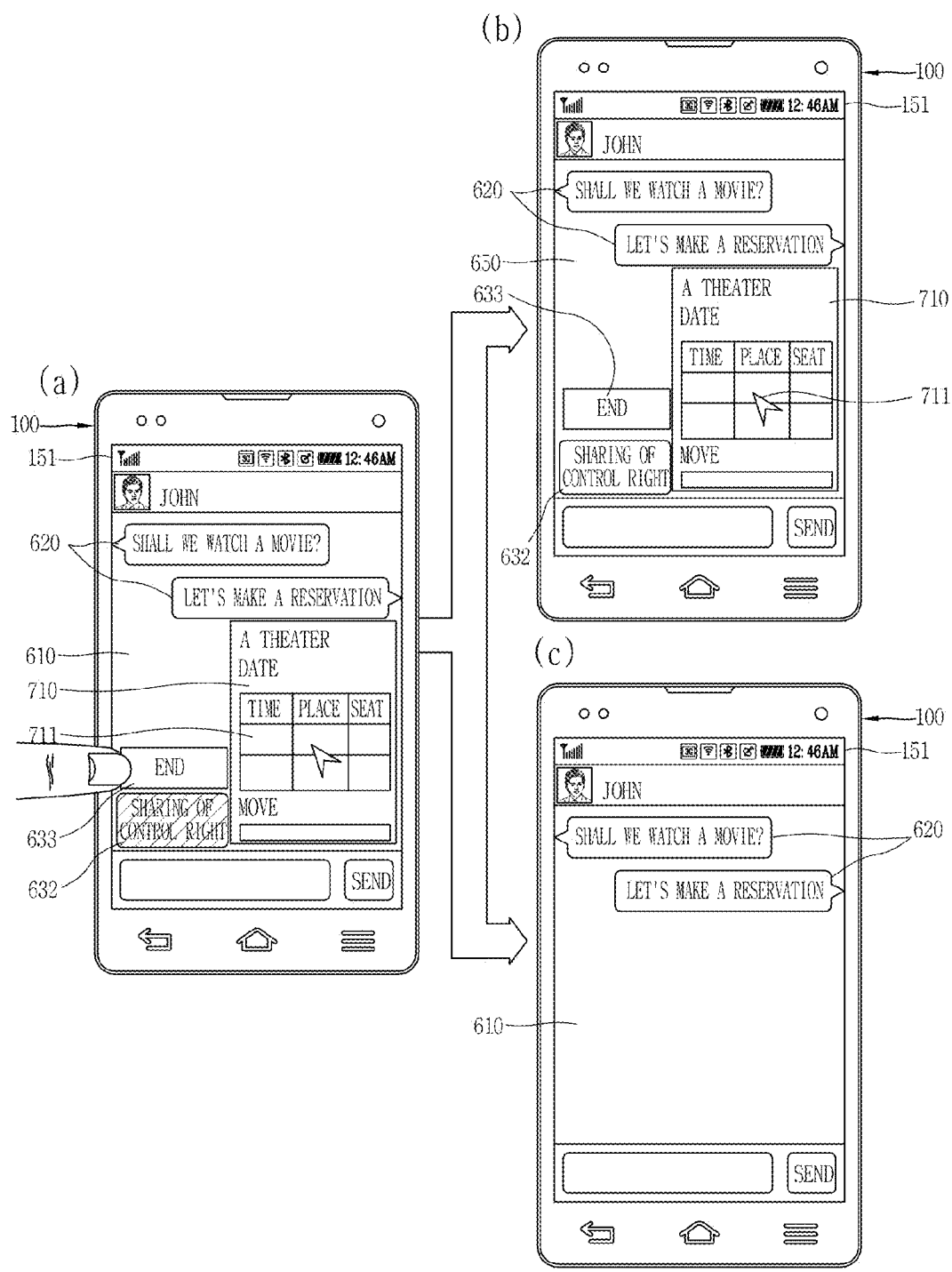
FIG. 8A is a conceptual view illustrating a plurality of graphic images output to an execution screen, for control of a control right.

FIG. 8A is a conceptual view illustrating a plurality of graphic images output to the execution screen, for control of a control right.

Referring to FIG. 8A(a), the display unit 151 outputs the control screen 710, a second graphic image 632, and a third graphic image 633, to the execution screen 610. Preferably, the second and third graphic images 632, 633 are output to regions adjacent to the control screen 710. As aforementioned, a touch input for allowing or restricting a control right to or from a user is applied to the second graphic image 632. As the control right is allowed or restricted, the pointer 711 is output to the control screen 710, or the pointer 711 output to the control screen 710 disappears.

The controller 180 may terminate at least one of the control right and an activated state of the second application, based on a touch input applied to the third graphic image 633.

Referring to FIGS. 8A(a) and 8A(b), if a touch input is applied to the third graphic image 633, the controller 180 restricts reception of a wireless signal from another party for control of the second application, and transmission of information of the second application. Thus, the display unit 151 restricts output of the pointer 711, and changes the shape of the second graphic image 632 (a restricted state of a control right).

The controller 180 controls the second application based on a touch input applied to the control screen 710 on the display unit 151. Information about the controlled state of the second application is not transmitted to the external terminal.

Although not shown, the display unit of the external terminal may restrict output of the control screen. The display unit may output the control screen as a stationary image even after the second application is controlled. In this case, even if a touch input is applied to the control screen output to the display unit, the second application is not controlled.

Referring to FIGS. 8A(a) and 8A(c), if a touch input is applied to the third graphic image 633, the controller 180 may control the display unit 151 to terminate the activated state of the second application, and to restrict output of the control screen 710 to the execution screen 610.

Thus, a control right of another party is not allowed, and the display unit of the external terminal may restrict output of the control screen 710 or may continuously output the control screen 710 which is in a stationary state.

Figure 8B:
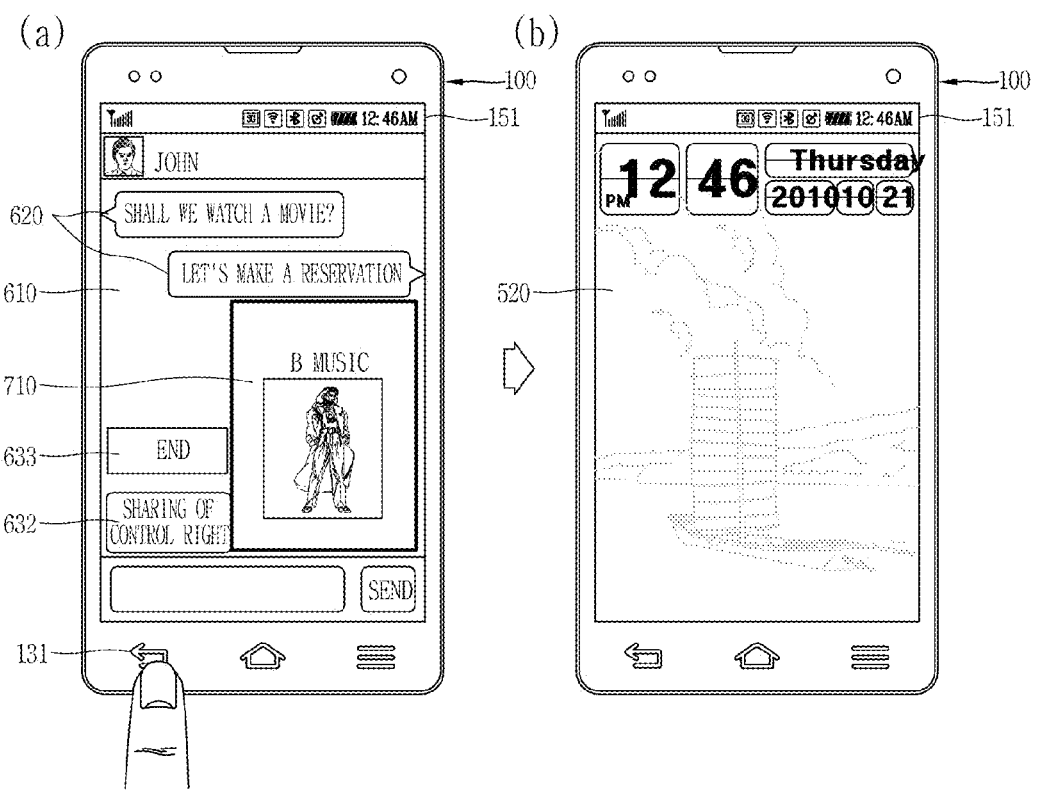
FIG. 8B is a conceptual view illustrating a control method for terminating the second application will be explained.
Figure 8B:
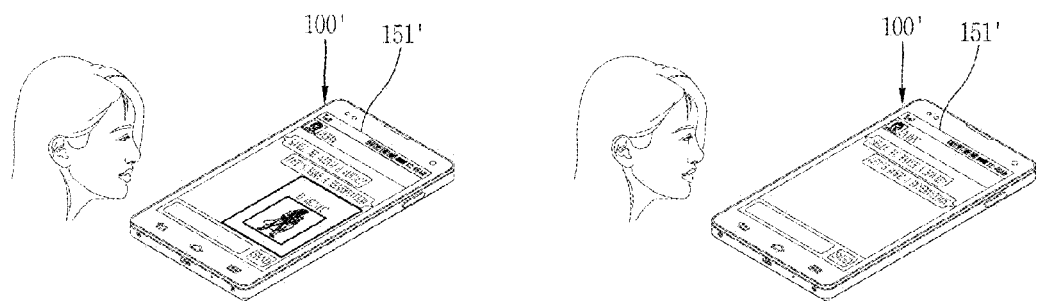

Referring to FIG. 8B, a control method for terminating the second application will be explained. The display unit 151 outputs the execution screen 610 of the first application and the execution screen 710 of the second application.

The controller 180 may terminate the executed state of the first application, based on a touch input applied to the first manipulation unit 131. The touch input applied to the first manipulation unit 131 corresponds to a control command for terminating an application being executed, and the present invention is not limited to the touch input applied to the first manipulation unit 131.

The controller 180 terminates the first application, and controls the display unit 151 to convert the execution screen 610 into a home screen page 520, based on the touch input. That is, output of the control screen 710 of the second application to the display unit 151, is also restricted.

Even if the controller 180 terminates the executed state of the first application based on the touch input, the second application may maintain a deactivated state while being executed.

Referring to FIG. 8B(b), the controller 180 controls the wireless communication unit to transmit information indicating that the second application has been re-converted into a deactivated state as the executed state of the first application is terminated. Thus, the display unit 151' of the external terminal 100' restricts output of the control screen 710. That is, the second application converted into an activated state while the first application is being executed, is re-converted into a deactivated state as the executed state of the first application is terminated. Thus, the controller 180 restricts reception of a wireless signal for controlling the second application.

Figure 9A:
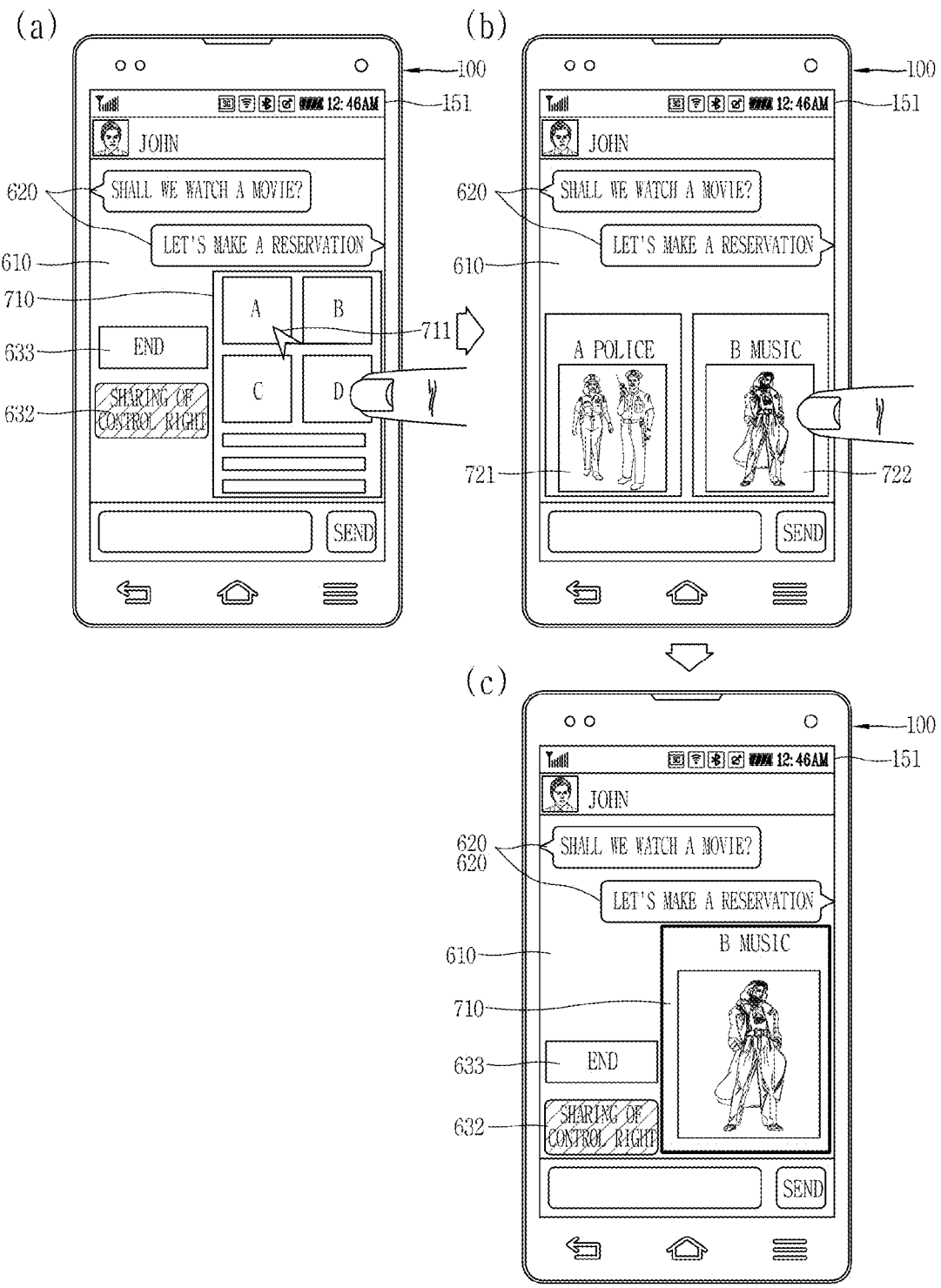
FIGS. 9A and 9B are conceptual views illustrating a method for outputting a control screen when control commands collide with each other.
Figure 9B:
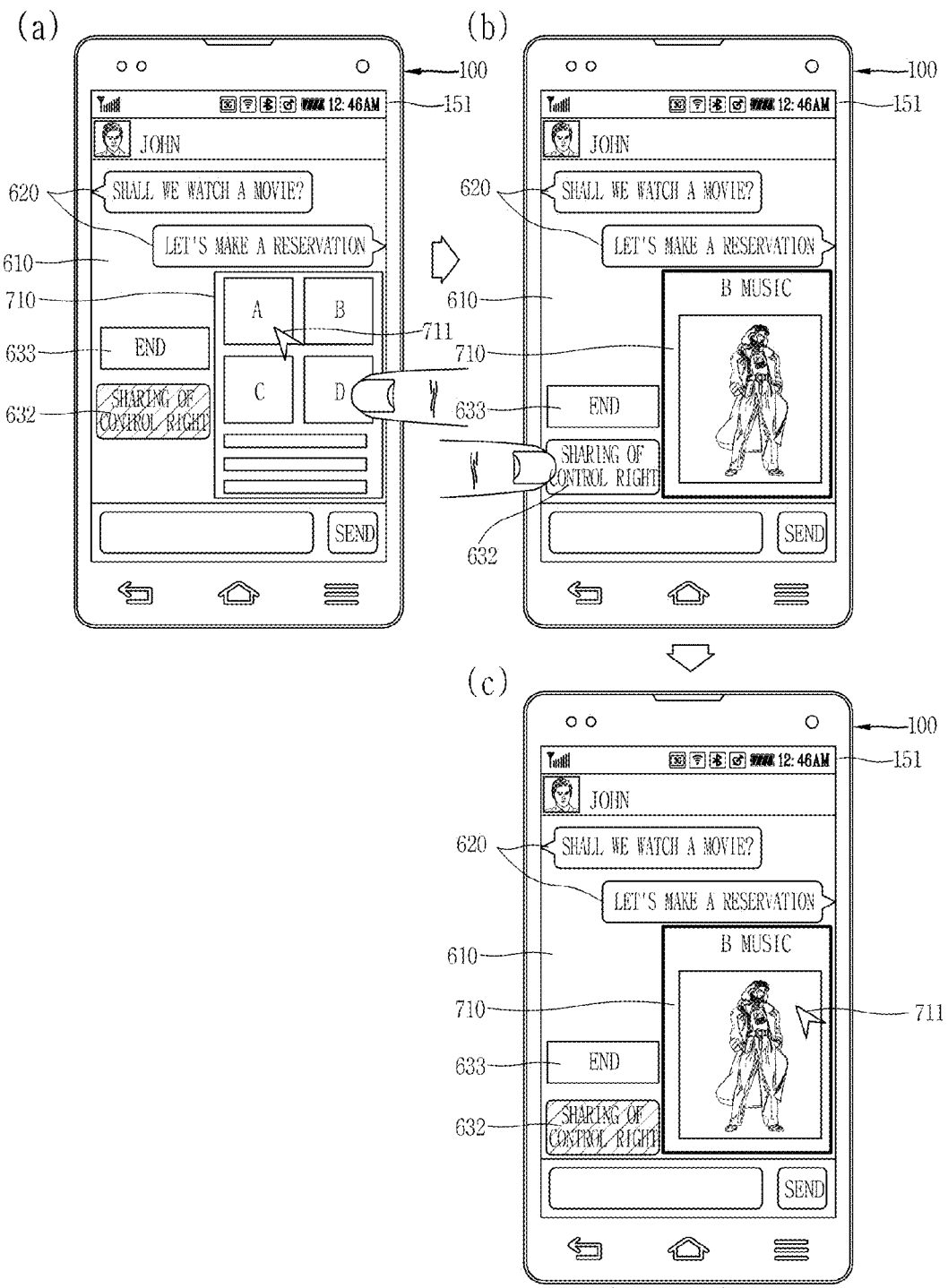

FIGS. 9A and 9B are conceptual views illustrating a method for outputting a control screen when control commands collide with each other. If a wireless signal for controlling the second application is received from the external terminal, the second application is controlled based on the wireless signal and a touch input applied to the control screen 710.

Referring to FIGS. 9A(a) and 9A(b), if different control commands are applied based on the wireless signal and the touch input, the controller 180 controls the display unit 151 to output a first control screen 721 and a second control screen 722. For instance, when the wireless signal and the touch input select different graphic images included in the control screen 710, the controller 180 controls the display unit 151 to output the first control screen 721 and the second control screen 722.

The controller 180 controls the second application based on the touch input, and controls the display unit 151 to output screen information of the second application based on the touch input, to the first control screen 721.

The controller 180 controls the second application based on the wireless signal, and controls the display unit 151 to output screen information of the second application based on the wireless signal, to the second control screen 722. Preferably, the first and second control screens 721, 722 are output so as to be close to each other.

For selection of one of the first and second control screens 721, 722, the controller 180 may form the first and second control screens 721, 722 as graphic images for receiving a user's touch input. That is, while the first and second control screens 721, 722 are being output together, the controller 180 controls the second application based on the wireless signal or the touch input.

The controller 180 controls the display unit 151 to output the control screen 710 including the selected screen information, based on a touch input applied to the first control screen 721 or the second control screen 722.

In this case, the second application is controlled based on the re-received wireless signal and the touch input.

However, the present invention is not limited to this. That is, the second application may be temporarily controlled in an output state to the first and second control screen 721, 722. Then, the second application may be finally controlled based on a selection after the control.

Referring to FIG. 9B, a method for outputting the control screen when control commands collide with each other according to another embodiment of the present invention will be explained.

In a case where control commands by the wireless signal and the touch input collide with each other, the controller 180 may control the wireless communication unit 110 to block reception of the wireless signal. Thus, the display unit 151 outputs the second graphic image 632 after transformation, such that a blocked state of a control right of another party is informed. The controller 180 controls the second application, based on a touch input applied to the display unit 151.

The controller 180 may control the wireless communication unit 110 to execute wireless communication for controlling the second application, based on a touch input applied to the second graphic image 632.

In this embodiment, when the control commands collide with each other, the controller 180 automatically controls a control right of another party not to be allowed, and controls the second application based on a user's control command.

Thus, control of the application based on a control command against a user's intention may be prevented.

Figure 10A:
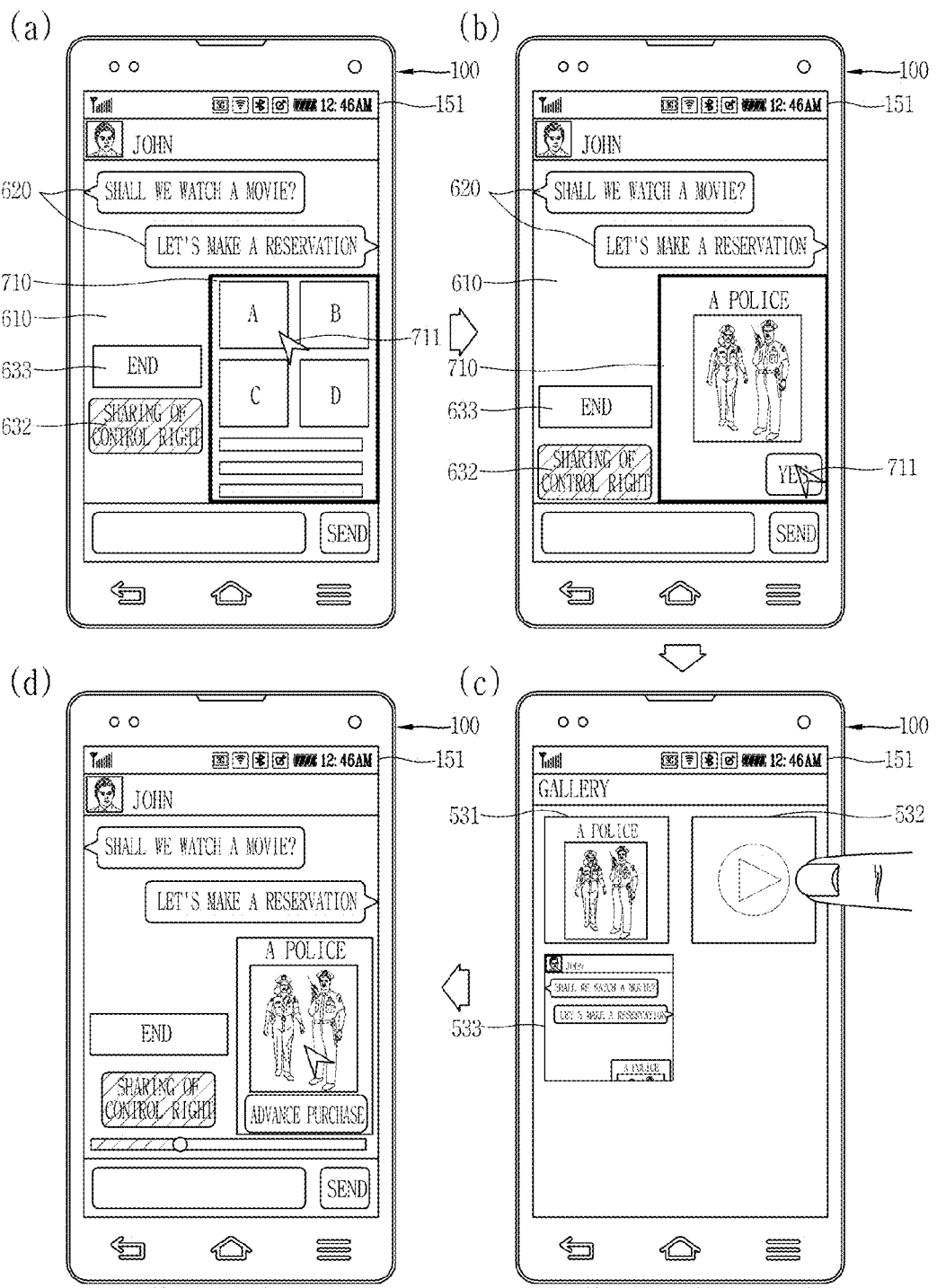
FIGS. 10A and 10B are conceptual views illustrating a method for storing a controlled state of a second application when a control right is allowed to another party.
Figure 10B:
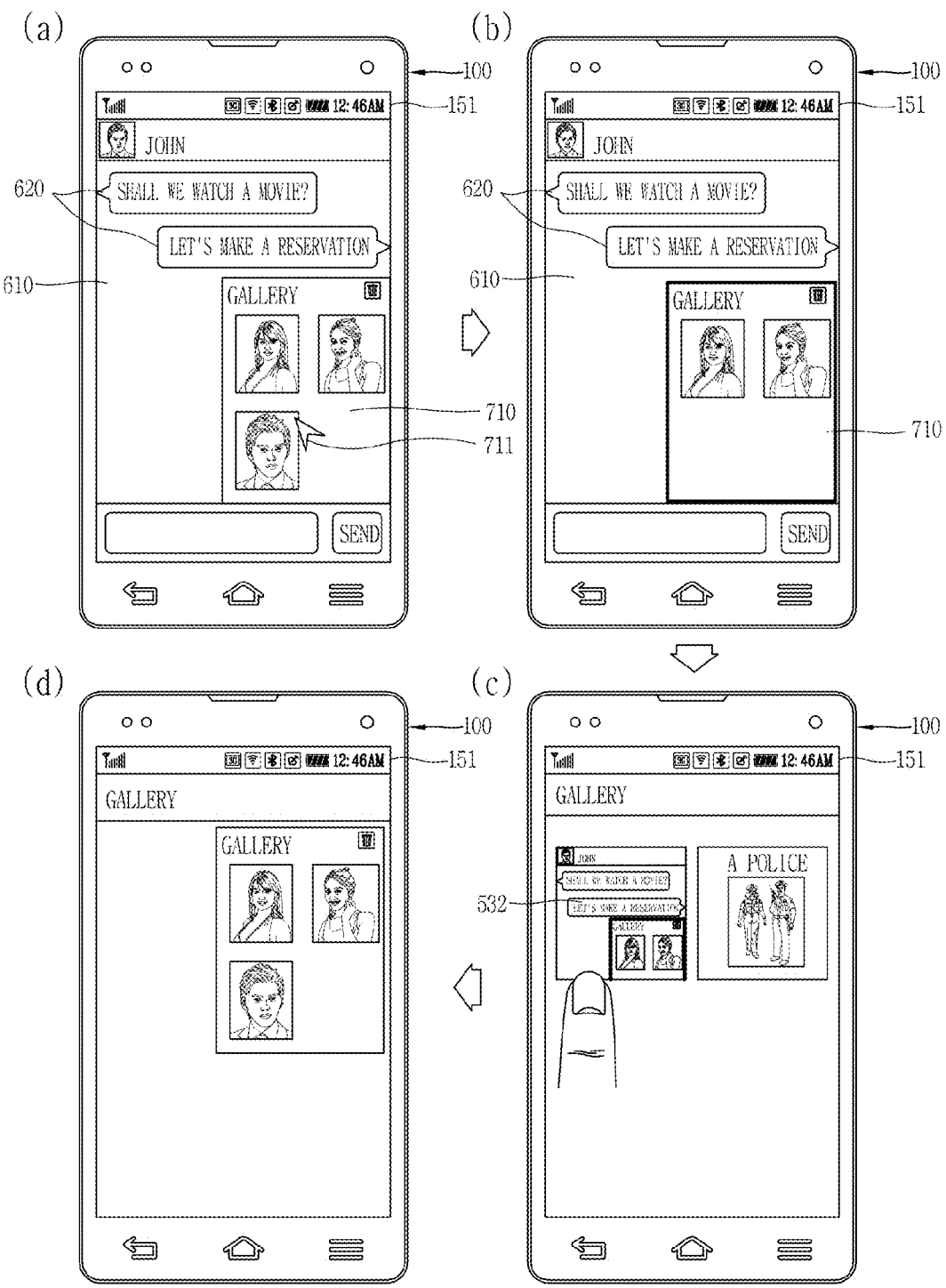

FIGS. 10A and 10B are conceptual views illustrating a method for storing a controlled state of the second application when a control right is allowed to another party.

Referring to FIG. 10A, a method for storing a controlled state of an application in the form of a media file will be explained. Referring to FIGS. 10A(a) and 10A(b), the controller 180 controls the second application based on a wireless signal received from the external terminal. And the display unit 151 outputs the pointer 711 based on the wireless signal, to the control screen 710. The display unit 151 converts screen information output to the control screen 710, based on the wireless signal.

If information about the second application is received by the external terminal, and if the second application is controlled based on the wireless signal or a user's touch input, the controller 180 may store a controlled state of the second application, as a still image or a video file.

Referring to FIGS. 10A(b) and 10A(c), once the screen information on the control screen 710 is changed by control of the second application, the controller 180 controls the display unit 151 to store the changed information, as an image file 531. That is, the control screen 710 is stored as an image.

The controller 180 controls the memory 160 to store therein, a change of video data output to the control screen 710, as a video file 532. The change of the video data corresponds from a time point when the wireless signal or the touch input has been applied, to a time point when the second application has been controlled based on the wireless signal or the touch input.

The controller 180 may control the mobile terminal to play the video file 532 stored in the memory 160. Thus, a user may check again a controlled state of the second application by the user and another party. Further, in a case where the second application is controlled based on another party's wireless signal irrespective of an intention of the user, the user may check the controlled state.

The controller 180 may control the memory 160 to store therein the execution screen 610 and the control screen 710, as an image file 533. That is, the controller 180 may form the image file 533 by capturing time information output to the display unit 151, at a time point when the second application has been controlled.

Thus, a user may be provided with information about content included in the first application, and information about a controlled state of the second application. For instance, the user may check dialogue contents with another party, and a controlled state of the second application.

The controller 180 may control the memory 160 to store therein a controlled state of the second application, only in a case where the second application is controlled based on the wireless signal.

The controller 180 may control the memory 160 to automatically store therein a controlled state of the second application. However, the present invention is not limited to this. That is, the controlled state of the second application may be stored according to a user's control command. And the controlled state of the second application may be stored in a storage space of a gallery application for storing captured photos.

In this embodiment, in a case where an application of the mobile terminal is controlled by not only a user but also another party, the user may check the controlled state of the application more precisely. This may allow the user to check and correct the controlled state of the application in a more convenient manner, when the controlled state of the application is against an intention of the user.

Referring to FIG. 10B, a method for restoring an initial state of the second application will be explained. The controller 180 controls the memory 160 to store therein the initial state of the second application, in a case where the second application is controlled based on the wireless signal or the touch input.

Referring to FIGS. 10B(a) and 10B(b), the second application may be a gallery application for outputting stored photos. The controller 180 may control photos stored in the storage space of the gallery application to be deleted, based on a control command by the received wireless signal.

If the control command is applied, the controller 180 may configure a state of the second application before control based on the control command, as backup data. And the controller 180 controls the memory 160 to store therein the backup data. Further, the controller 180 controls the memory 160 to store therein an image file indicating a controlled state of the second application. The image file may be screen information of the control screen 710, or a capture image of the execution screen 610 including the control screen 710.

Referring to FIGS. 10B(c) and 10B(d), the controller 180 may restore a controlled state of the second application, using the backup data, based on a touch input applied to the image file.

That is, the controller 180 may restore a photo deleted by the wireless signal, using the backup data, on the second application corresponding to a gallery application.

In this embodiment, even if an application is controlled by another party against an intention of a user, an initial state of the application may be restored by a selection of the user.

Figure 11A:
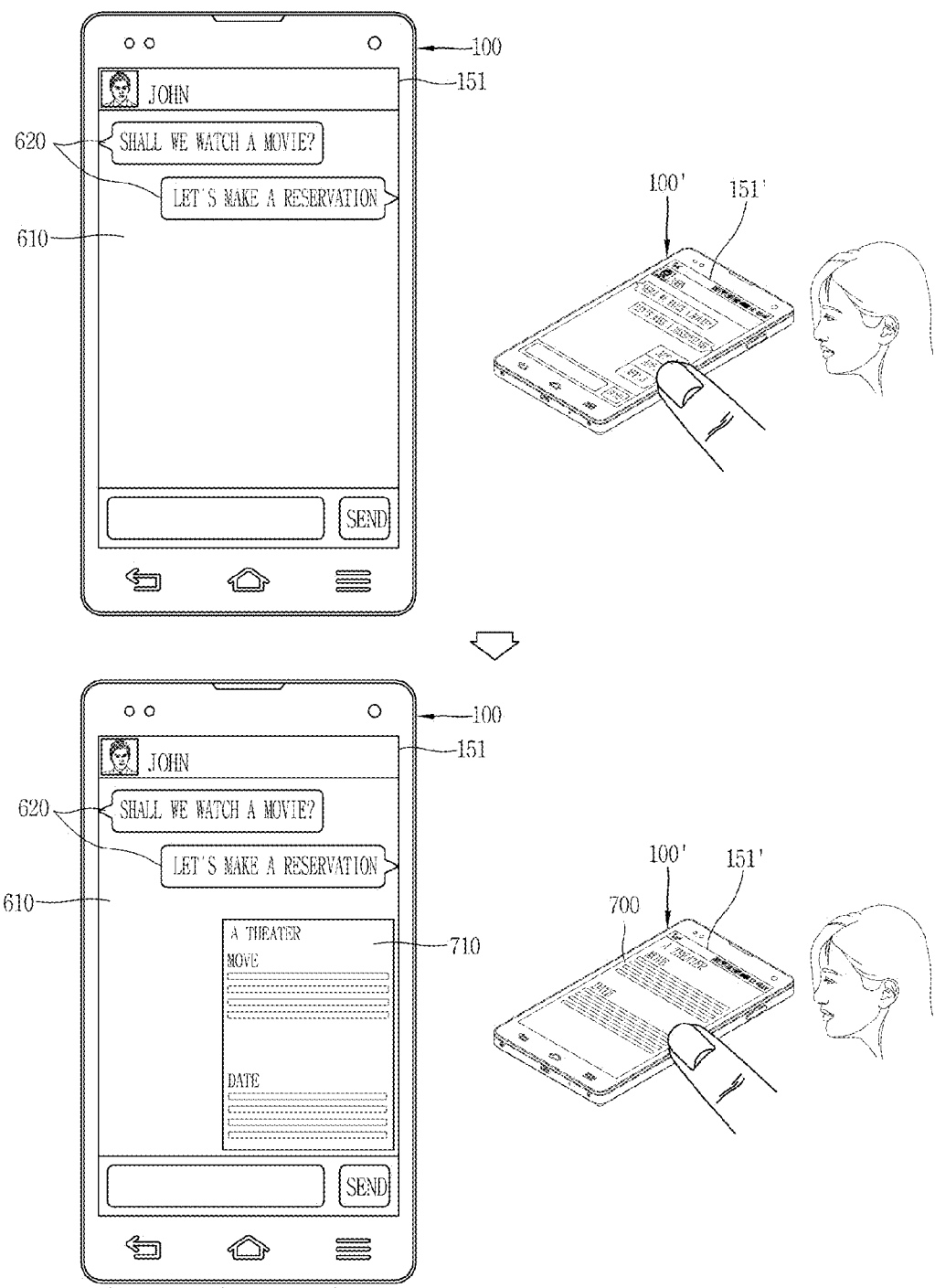
FIGS. 11A and 11B are conceptual views illustrating a method for controlling a mobile terminal when a control right of an application executed on an external terminal is generated.
Figure 11B:
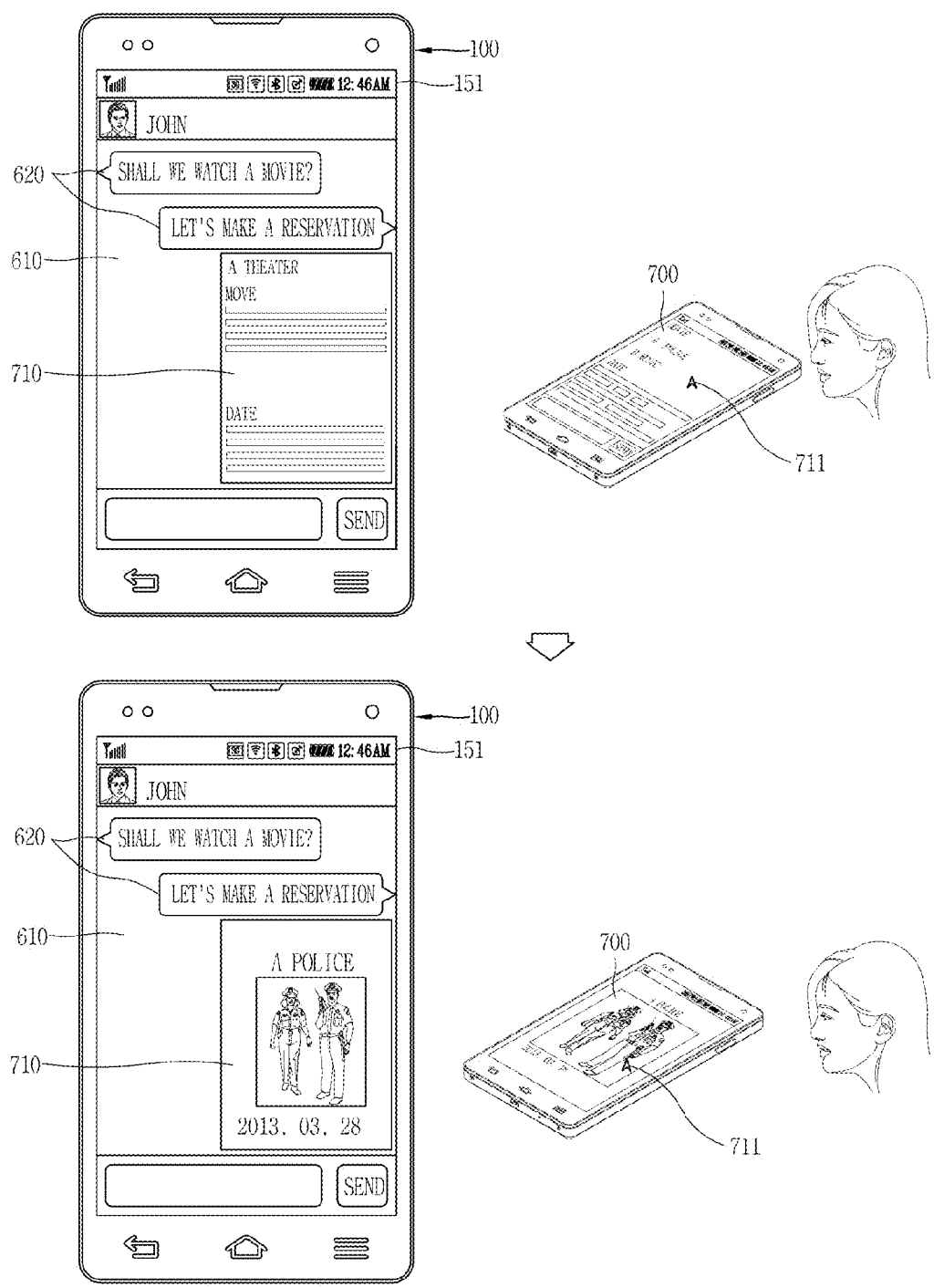

FIGS. 11A and 11B are conceptual views illustrating a method for controlling a mobile terminal when a control right of an application executed on an external terminal is generated.

The controller 180 controls the display unit 151 to output the control screen 710 to the execution screen 610 of the first application, based on information about the second application received from the external terminal.

For instance, upon selection of the second application from the execution screen of the first application output to the display unit 151' of the external terminal, the execution screen of the second application is activated on the display unit 151'. The wireless communication unit 110 outputs the control screen 710, using the information about the second application activated on the display unit 151', and the execution screen of the second application.

The controller 180 controls the wireless communication unit 110 to real-time receive information about the execution screen of the second application controlled based on a touch input applied to the display unit 151' of the external terminal. The controller 180 outputs the control screen 710, based on the real-time received information about the execution screen of the second application.

If a control right is allowed to another party (i.e., a touch input for controlling the second application is applied to the screen information, the controller 180 controls the display unit 151 to display a notification on the control screen. For instance, if a control right is allowed to the mobile terminal, the controller 180 may control the display unit 151 to change a color, a shape, a brightness, etc. of the control screen, or to highlight the control screen.

Referring to FIG. 11B, the controller 180 controls the second application as the display unit 151 receives a user's touch input applied to the control screen 710. That is, the controller 180 generates a wireless signal for controlling the second application based on a touch input applied to the control screen 710, and controls the wireless communication unit to transmit the wireless signal to the external terminal.

The external terminal is an application wirelessly-connected in order to transmit or receive content as the first application is activated.

The controller 180 real-time transmits the wireless signal to the external terminal based on the touch input, and receives information about a controlled state of the second application controlled based on the wireless signal, thereby controlling the display unit 151 to output the control screen 710.

Figure 12A:
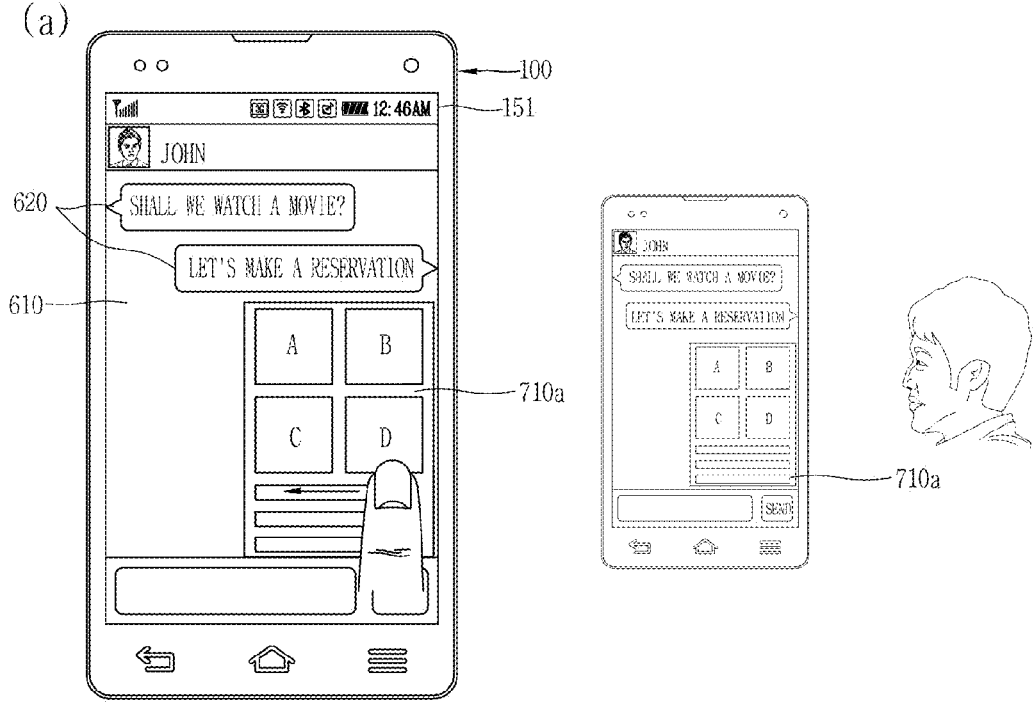
FIGS. 12A and 12B are conceptual views illustrating a control method when there are a plurality of wirelessly-connected applications, or a plurality of application to be controlled.
Figure 12A:
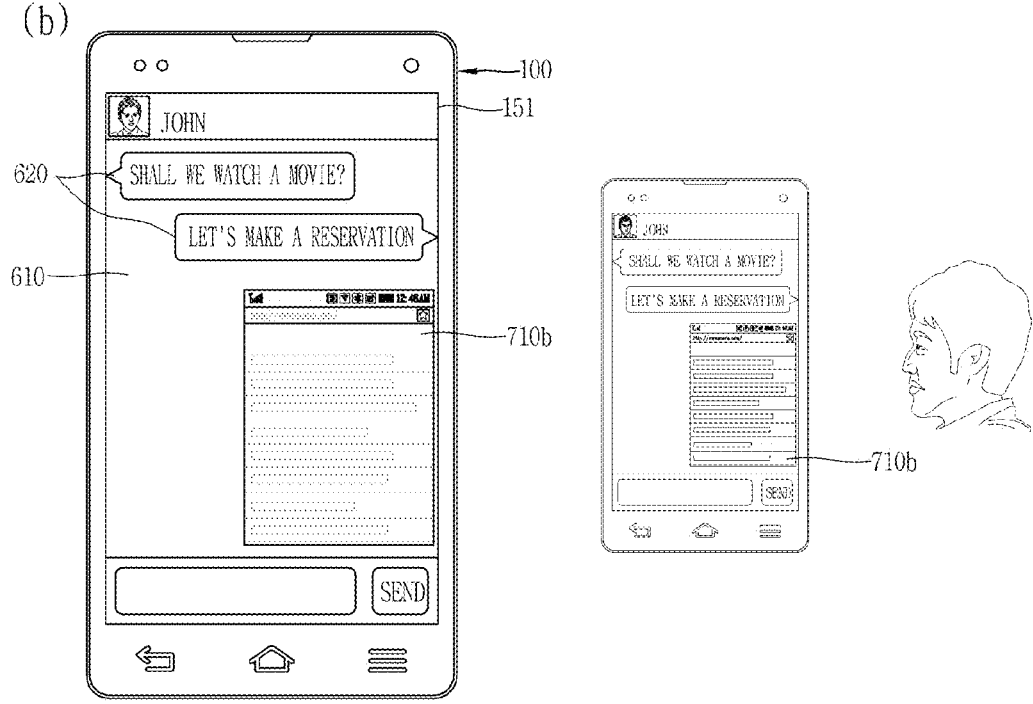
Figure 12B:
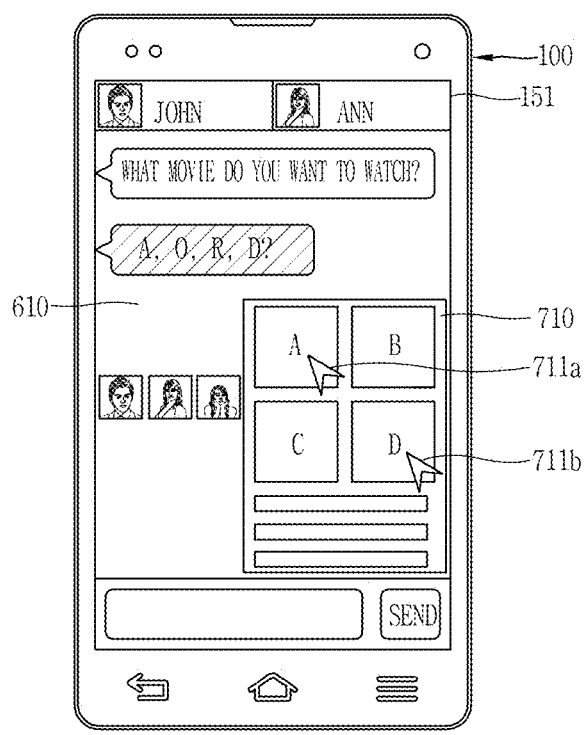

FIGS. 12A and 12B are conceptual views illustrating a control method when there are a plurality of wirelessly-connected applications, or a plurality of application to be controlled.

Referring to FIG. 12A, will be explained a control method when a plurality of applications rather than a first application are activated. In a state where the execution screen 610 of the first application has been output to the display unit 151, the controller 180 may activate second and third applications, based on a user's control command.

For instance, the controller 180 may select a plurality of applications corresponding to the control screen, based on a touch input applied to the first graphic image 631 (refer to FIG. 7A).

The display unit 151 outputs a first control screen 710a corresponding to an execution screen of the second application among the plurality of applications. The controller 180 controls the wireless communication unit to transmit, to the external terminal 100', information about the second application corresponding to the first control screen 710a. Thus, the display unit 151' of the external terminal 100' outputs the execution screen of the first application, and the first control screen 710a.

The controller 180 controls the second application based on a touch input applied to the first control screen 710a on the display unit 151'.

The controller 180 controls the display unit 151 to convert the first control screen 710a into a second control screen 710b corresponding to an execution screen of the third application, based on a touch input applied to the control screen 710. The touch input may be a dragging type of touch input consecutively applied in a horizontal direction of the display unit 151.

The controller 180 transmits information about the third application rather than information about the second application, and transmits a control signal for converting the first control screen 710a into the second control screen 710b.

Thus, the display unit 151' of the external terminal converts the first control screen 710a into the second control screen 710b. While the second control screen 710b is being output, another party cannot control the second application.

In this embodiment, a plurality of applications may be selectively activated with an activated application, and the mobile terminal may real-time share information about the selectively-activated application with an external terminal. This may allow a user to share much information with another party, in a more convenient manner.

Referring to FIG. 12B, will be explained a control method for controlling the second application when the mobile terminal wirelessly communicates with a plurality of external terminals. The controller 180 controls the wireless communication unit 110 to transmit or receive content to or from a plurality of external terminals through the first application. For instance, the first application may provide a group chatting space of a plurality of users.

The display unit 151 outputs content received from the plurality of external terminals, and content input by a user, in a differentiated manner.

If the second application is activated in an activated state of the first application, the controller 180 controls the display unit 151 to output the control screen 710 to the execution screen 610.

The controller 180 controls the display unit 151 to output a plurality of fourth graphic images 634 corresponding to the plurality of external terminals. The controller 180 controls the wireless communication unit 110 to receive a wireless signal for controlling the second application from the external terminal, or not to receive the wireless signal, based on a touch input applied to the fourth graphic images 634.

If a control right of the second application is allowed to the external terminal by using the plurality of fourth graphic images 634, the display unit 151 outputs at least one pointer 711 to the control screen 710, based on the number of allowed external terminals. In this case, each pointer 711 is controlled based on a wireless signal received from each external terminal.

The controller 180 may control the second application based on the wireless signal, and may control the second application based on a touch input applied to the display unit 151.

Although not shown, when control commands of the second application corresponding to a plurality of received wireless signals collide with each other, the controller 180 may represent the control commands by blocking reception of a wireless signal from at least one external terminal, or by dividing the display unit into a plurality of control screens.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A mobile terminal capable of executing a plurality of applications, the mobile terminal comprising:
   a wireless communication unit;
   a display; and
   a controller operably coupled to the wireless communication unit and the display, and configured to:
   cause the display to display an execution screen of a first application;
   cause the display to display a control screen for controlling a second application being executed while the first application is executed such that the control screen overlaps with at least a portion of the execution screen;
   cause the wireless communication unit to transmit information about the second application to an external terminal, and to receive a wireless signal from the external terminal in order to control the second application;
   cause the display to display a pointer on the control screen based on the wireless signal;
   cause the display to display a graphic image for controlling a control right about the second application on the execution screen while the control screen is displayed to allow or restrict the control right of the external terminal, the external terminal allowed to control the second application when the control right is allowed and the external terminal restricted from controlling the second application when the control right is restricted;
   cause the wireless communication unit to restrict receiving of the wireless signal transmitted from the external terminal in response to a touch input received at the graphic image, the pointer no longer displayed on the control screen in response to the touch input restricting the control right;
   cause the wireless communication unit to transmit the information about the second application and information about the control screen to the external terminal while the execution screen and the control screen are displayed and while the external terminal is restricted from controlling the second application;
   cause the wireless communication unit to receive the wireless signal transmitted from the external terminal in response to a touch input received at the graphic image after the control right is restricted;
   control the control screen based on the received wireless signal or a touch input applied to the control screen;
   cause the wireless communication unit to transmit information indicating that the second application has been converted into a deactivated state and restrict reception of the wireless signal transmitted from the external terminal when the first application is terminated; and
   control the control right of the external terminal not to be allowed and control the second application based on a second control command when a first control command corresponding to the received wireless signal and the second control command corresponding to the touch input applied to the control screen collide with each other.

2. The mobile terminal of claim 1, wherein the controller is further configured to cause the display to restrict display of one region of the control screen based on the addition or change of the content.

3. The mobile terminal of claim 2, wherein the controller is further configured to cause the display to display a second graphic image to receive a touch input for re-displaying the control screen when the displaying of the control screen is entirely restricted by the content of the execution screen.

4. The mobile terminal of claim 2, wherein the controller is further configured to cause the display to be divided into a first region for displaying the control screen and a second region for displaying the added and changed content.

5. The mobile terminal of claim 1, wherein the controller is further configured to cause the display to convert the control screen into a first divided screen controlled based on the user's touch input and a second divided screen controlled based on the received wireless signal.

6. The mobile terminal of claim 1, further comprising a memory, wherein the controller is further configured to cause the memory to store a state of the control screen changed by the wireless signal when the second application is controlled based on the wireless signal received via the wireless communication unit.

7. The mobile terminal of claim 6, wherein the controller is further configured to cause the memory to store a state of the control screen changed due to control of the second application as a moving image.

8. The mobile terminal of claim 7, wherein the controller is further configured to:
cause the memory to store backup information of the second application, together with the moving image, when the second application is controlled based on the wireless signal;
restore an initial state of the second application using the backup information corresponding to the moving image selected by a user.

9. The mobile terminal of claim 7, wherein the controller is further configured to cause the memory to store the changed state of the control screen and the execution screen of the first application as an image.

10. The mobile terminal of claim 1, wherein the controller is further configured to cause the display to display a second graphic image together with the control screen, the second graphic image for selecting at least one of the wireless signal or the user's touch input in order to control the second application.

11. The mobile terminal of claim 10, wherein:
a plurality of wireless signals are received from a plurality of external terminals in order to control the second application; and
the controller is further configured to cause the display to display a third graphic image for selecting the plurality of wireless signals.

12. The mobile terminal of claim 1, wherein the controller is further configured to cause the wireless communication unit to restrict reception of the wireless signal for controlling the second application when the execution of the second application is terminated.

13. The mobile terminal of claim 12, wherein if the execution screen of the first application is converted into an execution screen of the second application, the controller is further configured to:
convert the execution screen of the first application to an execution screen of the second application; and
cause the wireless communication unit to continuously transmit information about the execution screen of the second application to the external terminal.

14. The mobile terminal of claim 1, wherein the controller is further configured to cause the display to display a second graphic image on the execution screen of the first application to receive a touch input for selecting an application being executed on the mobile terminal in order to transmit a wireless signal for controlling the control screen to the external terminal.

15. A method for controlling a mobile terminal, the method comprising:
performing wireless communication with an external terminal;
displaying, on a display, an execution screen of a first application and displaying a control screen for controlling a second application being executed while the first application is executed such that the control screen overlaps with at least a portion of the execution screen;
controlling the second application based on at least one of a user's touch input applied to the control screen or a wireless signal received from the external terminal;
displaying a pointer on the control screen based on the wireless signal received from the external terminal;
displaying a graphic image for controlling a content right about the second application on the execution screen while the control screen is displayed to allow or restrict the control right of the external terminal, the external terminal allowed to control the second application when the control right is allowed and the external terminal restricted from controlling the second application when the control right is restricted;
restricting receiving of the wireless signal transmitted from the external terminal in response to a touch input received at the graphic image, the pointer no longer displayed on the control screen in response to the touch input restricting the control right;
transmitting information about the second application and information about the control screen to the external terminal while the execution screen and the control screen are displayed and while the external terminal is restricted from controlling the second application;
receiving the wireless signal transmitted from the external terminal in response to a touch input received at the graphic image after the control right is restricted;
controlling the control screen based on the received wireless signal or a touch input applied to the control screen;
transmitting information indicating that the second application has been converted into a deactivated state and restricting reception of the wireless signal transmitted from the external terminal when the first application is terminated; and
controlling the control right of the external terminal not to be allowed and controlling the control screen based on a second control command when a first control command corresponding to the received wireless signal and the second control command corresponding to the touch input applied to the control screen collide with each other.

16. The method of claim 15, further comprising dividing the display into a first region for displaying the control screen and a second region for displaying the content when a position of the control screen is changed.

* * * * *